United States Patent [19]

Civardi et al.

[11] 4,122,223

[45] Oct. 24, 1978

[54] TREATED FABRIC STRUCTURE

[75] Inventors: Frank P. Civardi, Wayne; Frederic C. Loew, Ridgewood, both of N.J.

[73] Assignee: Inmont Corporation, New York, N.Y.

[21] Appl. No.: 545,548

[22] Filed: Jan. 30, 1975

Related U.S. Application Data

[63] Continuation-in-part of Ser. No. 474,406, May 30, 1974, abandoned, and a continuation-in-part of Ser. No. 398,696, Sep. 19, 1973, abandoned, said Ser. No. 474,406, is a continuation-in-part of Ser. No. 398,696.

[30] Foreign Application Priority Data

Sep. 13, 1974 [CA] Canada ................................ 209186
Sep. 19, 1974 [GB] United Kingdom ............... 40901/74

[51] Int. Cl.² ............................................. D06C 11/00
[52] U.S. Cl. ......................................... 428/91; 36/45; 156/308; 428/95; 428/96; 428/248; 428/252; 428/304; 428/310; 428/425; 428/904

[58] Field of Search ................. 428/904, 86, 90, 91, 428/93, 94, 96, 97, 425; 156/72, 250, 308; 36/45; 428/248, 252, 304, 310

[56] References Cited

U.S. PATENT DOCUMENTS

| 915,882 | 3/1909 | Pianko ................................... 428/91 |
| 931,469 | 8/1909 | Outerbridge .......................... 428/91 |
| 1,708,043 | 4/1929 | Bancroft ................................ 428/91 |
| 3,387,989 | 6/1968 | West et al. ............................. 428/91 |
| 3,399,102 | 8/1967 | Matsushita et al. ................... 428/91 |

*Primary Examiner*—James J. Bell

[57] ABSTRACT

An artificial leather sheet material, comprising a layer of permeable fabric made of interlaced multifiber yarns, the lower face of said fabric having an open nap of fibers teased from said yarns and bonded together, and a continuous layer of polymer material on the upper face of said fabric. The bonded nap may be subjected to spaced short cuts to give it a rough appearance.

24 Claims, 42 Drawing Figures

|←— 5mm —→|

Scale for Figs 2,4: |—10μ—|

Scale for Figs 1,3,5,12: |—0.5mm—|

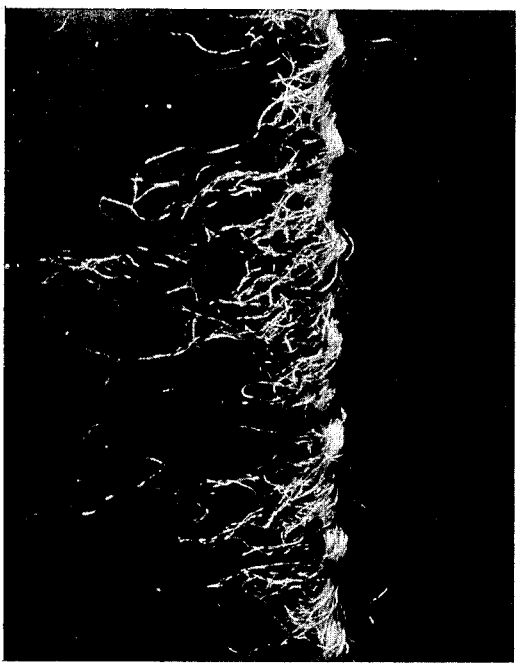
|← 5mm →|  FIG 1A
FIG 2A
FIG 3A
|← 0.5mm →|
|← 0.005 inch →|

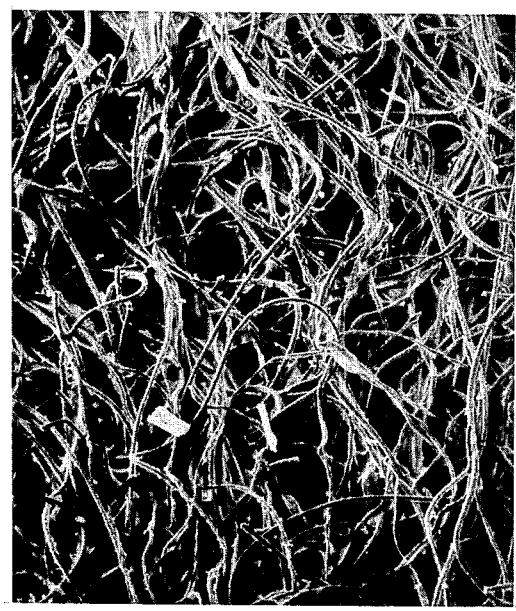
FIG 11A  |←— 1mm —→|  FIG 4A
FIG 5A |←— 0.5mm —→|

|← 0.5mm →|

|← 1mm →|

|←—— 5mm ——→|

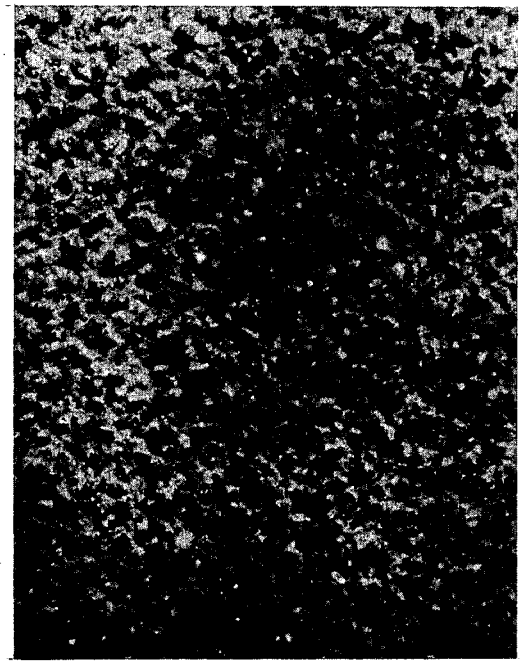
FIG 7A
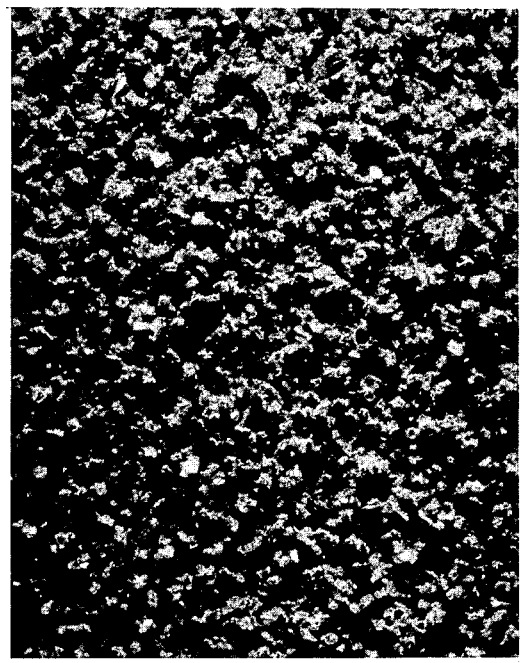
FIG 8A
FIG 13A
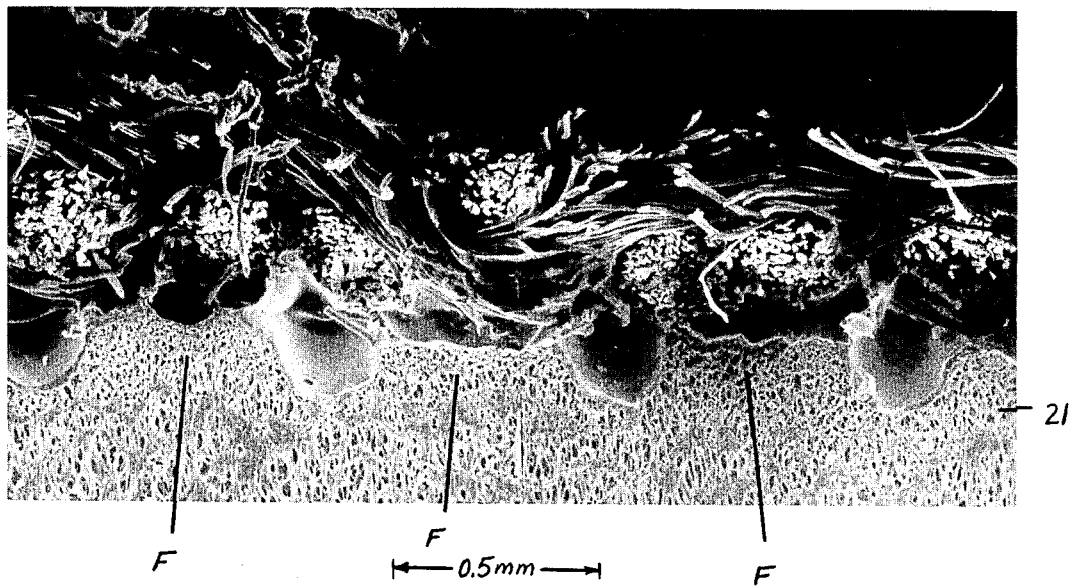

|← 0.5mm →|

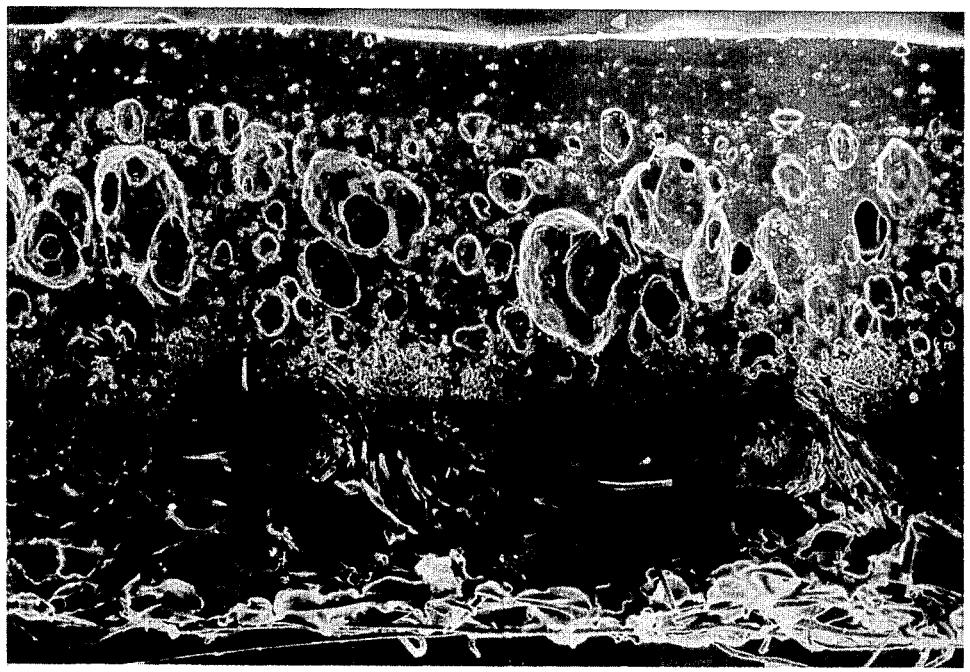
FIG 21
|← 1mm →|
FIG 22
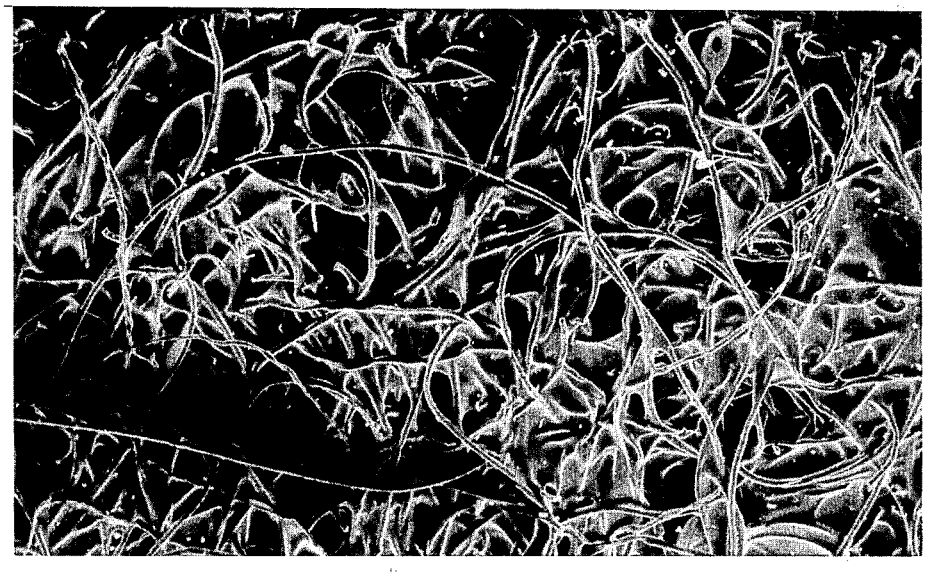

|← 1mm →|

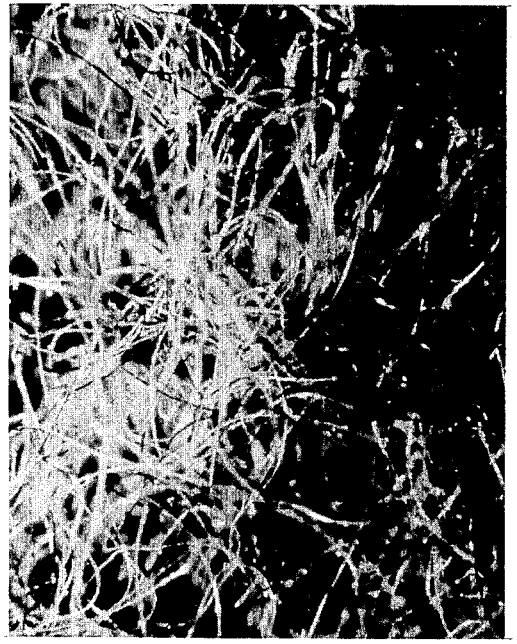
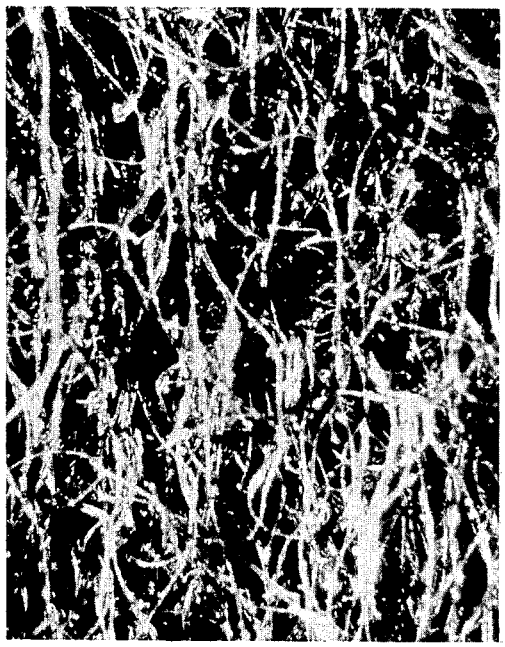
FIG 24  
Non-bonded Nap  
FIG 25
Before Test  
|← 1mm →|  
After 24 hrs. Test
FIG 26  
Bonded Nap  
FIG 27
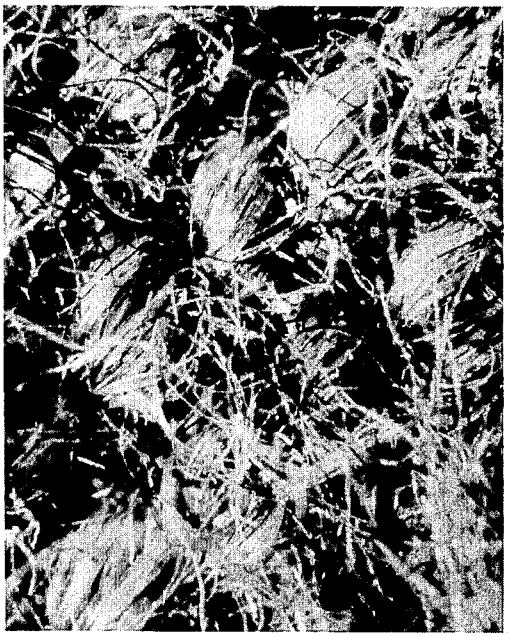

TREATED FABRIC STRUCTURE

This application incorporates by reference the entire disclosure of Civardi et al application Ser. No. 474,406 filed May 30, 1974 now abandoned and its parent application Civardi et al Ser. No. 398,696 filed September 19, 1973 now abandoned and is a continuation-in-part of said applications.

Synthetic leather materials having a fibrous backing are well known for use in making shoe uppers. Generally their outer, or top, face has a continuous layer of polymer material and the fibrous backing is a needle-punched impregnated non-woven or a fabric comprising interlaced (e.g. woven) multi-fiber yarns.

This application relates to synthetic leather materials of the type having a textile fabric backing comprising interlaced multi-fiber yarns. According to one aspect of the invention the bottom face of the fabric is napped and the napped fibers are then bonded together. For example, a fabric may be napped on one side, in conventional fashion as by passing it in contact with moving napping elements such as bristles or hooks (such as a high speed counter-rotating wheel having such napping elements projecting therefrom) to raise or tease out fibers from its yarns. In the case of woven fabric moving in the warp direction and subjected to oppositely moving napping elements, the nap fibers will originate primarily from the filling yarns which run transversely to the direction of movement of the napping elements, particularly when the face being napped has a preponderance of exposed filling yarns. The resulting nap is preferably a mass of fibers which lie in all directions, and having substantial components lying generally parallel to the main plain of the fabric. Usually the nap includes a significant proportion of fibers whose ends are not visible at the napped surface such as fibers whose both ends are buried within a yarn and whose intermediate portions arch through the nap zone. It should be noted that conventional staple fibers are generally at least 2 cm in length, and thus much longer than the exposed length of a yarn at the surface of the fabric (which exposed length is generally less than about 1 mm). Thus if the napping elements pull a length of even 1, 2 or 5 mm of a given fiber from an exposed yarn, one or both ends of that fiber will still be anchored in, and twisted with, the other filaments of that yarn. Less preferably, the nap may be sheared in conventional fashion, for example, so as to cut any fibers which may have been raised (e.g. at right angles to the plane of the fabric) to such an extent as to project significantly from the main nap zone. FIG. 14 is a plan view of the face of a napped and sheared fabric (specifically a 4/1 sateen weighing about 8.5 ounces per square yard (290 g/m$^2$) and composed of yarns of a blend of 75% polyester [i.e. polyethylene terephthalate] and 25% cotton with 60 filling yarns per inch and 60 warp yarns per inch, napped on the face having a preponderance of filling yarns). The extent of napping is preferably such that a substantial, but generally minor, proportion of the weight of the fibers is brought into the nap zone; for example about ½ to 1 ounce or more of fiber per square yard in the nap for a fabric weighing about 6 to 9 ounces per square yard. Generally the weight proportion of the fibers brought into the nap zone is above 1% such as about 2 or 5 to 20%, preferably in the range of about 2 to 10 or 15%, of the total weight of the fabric (the nap fibers generally are anchored in, and teased from, the filling yarns and accordingly, for fabrics in which the weight of filling yarns is about equal to the weight of the warp yarns, the weight proportion of the filling yarns in the nap is about 2 or 10 to 40%, such as about 4 to 30%, e.g. about 10 to 20%. It is preferably not such as to so weaken the fabric, by removal of fibers from its main load carrying zone, that its strength (and thus the strength of the laminate) will be below the level needed for the intended purpose.

The side of the fabric to be napped may be given an abrading treatment, e.g. with sandpaper, before napping, to sever some fibers at the exposed surfaces of the yarns.

The bonding of the nap fibers may be effected in various ways. In one preferred embodiment bonding is effected while substantially maintaining the nap in its open, low density state. For instance, the nap may be impregnated with a latex, such as a flexible acrylate polymer (e.g. polymerized ethyl acrylate or copolymers thereof) before or after lamination, taking care to avoid or minimize impregnation of the main fabric structure composed of interlaced multifiber yarns. A product of this type is illustrated in FIGS. 12 and 13 of the aforementioned parent application in which the fabric is a 4/1 sateen weighing about 6.5 ounces per square yard (220 g/m$^2$) and composed of yarns of a blend of 75% polyethylene terephthalate and 25% cotton, with 44 filling yarns per inch and 80 warp yarns per inch, the filling yarns having more fiber than the warp yarns, napped on the face having a predponderance of filling yarns, having its nap impregnated (prior to lamination), as with a latex of a flexible acrylate polymer, followed by evaporation of water from the latex, the amount of polymer being only a minor proportion (e.g. 5%) of the total weight of the fabric. As will be evident in said FIG. 13 (compare said FIG. 14) the deposited polymer bridges and bonds together nap fibers at spaced zones (e.g. 71, 72) along their lengths, and also forms occasional nodules thereon. The use of an aqueous latex is especially suitable when the nap comprises a high proportion (e.g. at least 50%) of highly water-absorbent fibers, such as cellulose fibers. The latex may be of a conventional elastomer such as a diene homopolymer or copolymer, e.g., rubbery butadiene-acrylonitrile copolymer which may be cross-linked as by vulcanization after impregnation. For other fibers, such as polyester fibers, it is often more desirable to apply the bonding agent in solution in volatile organic solvent, although either technique may be employed for either or both types of fibers. Typically the amount of bonding agent is within the range of about 5 to 20% or more, e.g. 50 or 60% of the total weight of the fiber of the fabric, depending on the proportion of the fabric in the nap and the thickness of the nap; the weight ratio of bonding agent to fiber in the nap may be, say, about 0.4:1, 1:1, 2:1, 5:1, 10:1 or 20.1.

Another way of bonding the nap fibers is by applying a thin layer of polymer to the surface of the nap. FIGS. 15 to 17 of the aforesaid parent application illustrate one such embodiment, in which the fabric is a 4/1 sateen weighing about 6.5 ounces per square yard (220 g/m$^2$) and composed of yarns of a blend of 75% polyethylene terephthalate and 25% cotton, with 44 filling yarns per inch and 80 warp yarns per inch, the filling yarns having more fiber than the warp yarns, napped on the face having a preponderance of filling, to which a layer of a solution of two-component cross-linking elastomeric polyurethane was applied to the nap (after lamination) by knife-coating followed by evaporation of the solvent and curing by heat, the amount of polyurethane so deposited being about 10 g per m². Prior to this treatment of the nap the measured thickness of the laminate was about 1.0 mm, while after the treatment it was about 1.2 mm (as measured with a standard gauge used for measuring the thickness of leather, e.g. an Ames gauge, which exerts a compressing force on the sheet whose thickness is being measured); thus, the thickness of the nap zone is over 0.2 mm. Other methods of bonding the individual nap fibers together at spaced points will be apparent to those skilled in the art. Thus it is within the broader scope of the invention to effect such bonding by suitable heating and/or solvent treatment, to tackify at least some of the nap fibers, and to bring them together, if necessary, to cause bonding.

It is also within the broader scope of the invention to carry out all or part of the napping after the application of the bonding agent and before the setting thereof. For instance one may apply (as by spraying) to the bottom face of the fabric, a latex (e.g. an acrylic latex such as water-diluted Rhoplex HA-8 containing about 5% of the dispersed polymer and some 95% of water), and thereafter subject said bottom face to a conventional napping operation before (or when) the water has evaporated sufficiently to make the resinous binder sticky; thereafter the napped fiber fabric may be passed through a drier to evaporate the water and set the binder.

The bonding of the nap fibers and the formation of the microporous layer on the flat face of the fabric may be carried out in a single continuous operation. For example, a coagulable solution of an elastomeric material may be used for impregnating the nap and then a coagulable elastomer mixture to form a substantial microporous layer may be applied to the flat face of the fabric, after which the whole assemblage may be coagulated by application of a non-solvent medium, such as water. Preferably the nap-impregnant is a solution in a water-miscible high boiling solvent and the coagulable microporous layer-forming mixture is a solution, in the same solvent, which has been made into a paste by inclusion of dispersed removable filler, such as a water soluble salt, the paste being applied in such thickness as to produce a layer which (after coagulation in water and drying) is, say, about 0.3 to 1 mm thick; then, while widthwise shrinkage of the fabric is prevented by carrying the fabric on a tenter frame to maintain it at substantially constant width during the subsequent processing, the whole assemblage may be passed into an aqueous coagulating bath and then leached (e.g. in water) to remove the filler, then dried and annealed (e.g. at about 150° C). Thereafter a finish coat may be applied. A particularly suitable solvent for the nap-impregnating solution and the paste composition is dimethylformamide ("DMF"). The solutions and micropore-forming pastes thereof are known in the art; see for instance, U.S. Pat. No. 3,590,112, particularly the "upper layer paste" thereof. To provide a softer product one may use a polyurethane made with a lesser amount of diisocyanate such as to give a polyurethane whose nitrogen content is, say, about 3 to 4%, e.g 3.2 or 3.5% N. Finishes to be applied to the upper surface of the microporous layer are also known in the art; see for instance, U.S. Pat. Nos. 3,590,112, 3,637,415 and 3,764,363. The nap-impregnating solution may be relatively dilute as compared to the solution used for the past composition; thus its polymer concentration may be, say, in the range of about 5 to 15%, e.g. 10%. Such a coagulable relatively dilute nap-impregnating solution may also be used in a process in which the microporous layer is a pre-formed layer; in such a process the setting or coagulation may be effected by exposing the impregnated nap to high humidity (e.g. an atmosphere of 95–100% relatively humidity) and then removing the solvent (e.g. DMF) by evaporation, as in an oven.

As indicated above the nap impregnant may be a latex. A particularly useful type of latex for nap impregnation is an aqueous dispersion of an elastomer polyurethane ionomer of either the cationic or anionic type (such as described, for instance, in the article by Dieterick, Keberle and Witt "Polyurethane Ionomers, a New Class of Block Polymers" in Angew. Chem. Internat. Edit. Vol. 9 (1970) No. 1 p. 40–50, and the references cited therein). Such a latex may also be employed as the adhesive for bonding the opposite face of the fabric to the other layers. (e.g. to the pre-formed microporous layer) of the structure.

The napping and bonding treatment makes it possible to produce, simply and at relatively low cost, a poromeric structure highly suitable for shoe uppers which has high strength, a soft desirable hand and good shoe making properties including resistance to show-through on lasting, good skiving, anti-fraying, and folding characteristics, and also has a bottom face having the appearance of a non-woven fabric, without the need for providing a non-woven or without the need for any of the operations, such as intensive needle-punching, heavy impregnation, splitting and buffing, characteristic of the manufacture of non-wovens for use in leather substitute. See the article by L.G. Hole, SATRA, on "Poromerics: their structure and use" in Rubber Journal April 1970 p. 72, 73, 75, 76, 80, 81, 83. In the broader aspects of the invention, the napped and bonded fabric may be used in composites, for synthetic leather, other than those of the type described above; for example, a microporous layer may be formed directly on the flat face by conventional techniques (such as those described, for instance, in U.S. Pat. Nos. 3,595,721, 3,677,871, 3,689,629, or 3,520,765) preferably without substantially impregnating the nap zone, or a preformed microporous layer of any desired density may be adhered thereto. It is also within the broader scope of the invention to employ the napped and bonded fabric as the base layer for a synthetic leather which need not be of the breathable or microporous type, e.g. when the layer overlying the fabric is a solid or a cellular (e.g. expanded) vinyl resin or polyurethane. Thus a vinyl plastisol (e.g. a dispersion of polyvinyl chloride in a liquid plasticizer thereof, which plasticizer solvates said polymer on heating) may be applied to a suitable backer (e.g. release paper) and the smooth side of the napped fabric brought into light laminating contact therewith, after which the assembly is heated to "fuse" plastisol to solid condition. Or the vinyl plastisol may be calendered or coated onto the smooth face of the napped fabric. Cellular products may be formed by using a blowing agent, for example, and the cellular layer may be in direct contact with the smooth race of the fabric or may be separated therefrom by an unblown solid layer. Formulation of blown plastisols is well known in the art; see for instance the article by Werner in the Oct. 1, 1961 issue of Modern Plastics. Thus, the materials may be those illustrated in the patent literature, such as U.S. Pat. Nos. 3,041,193, 3,709,752, or 3,446,693 or Harrington et al U.S. application Ser. No. 95,173 of Dec. 4, 1970, except for the use of the napped, bonded, fabric as described herein. The thickness of the vinyl layer(s) may for instance be in the range of about 0.2 to 1.5 mm, preferably about 0.5 to 1 mm. Descriptions of vinyl-coated fabrics and of the methods of producing the same are found in the Encyclopedia of Polymer Science and Technology, Interscience Publishers; see Vol. 6 (1967) p. 472–489 ("Fabrics, Coated"), Vol. 8 (1968) p. 210–231 ("Leather-Like Materials") and Vol. 14 (1971) p. 448–450 ("Vinyl Chloride Polymers (Fabrication)") whose disclosures are incorporated herein by reference. It is also within the broader scope of the invention to form a nap zone on the top face as well as the bottom face of the fabric, to shear the nap on the top face so as to provide a nap of uniform height and to then apply, to the upper nap, a layer of polymeric material, which need not be microporous (as in the manner described in U.S. Pat. NO. 3,574,106).

As indicated above, the laminate made from the napped bonded fabric has good skiving and folding characteristics. Skiving generally involves cutting with a mechanically operated knife (see FIG. 18) in a controlled manner to thin the sheet so that the thinned portion can be folded on itself and held in folded position (with interposed adhesive) forming an edge of substantially the same thickness as the main body of the sheet. During the skiving the knife is guided in a direction roughly parallel to the sheet for a substantial portion of its travel through the sheet. With the napped bonded constructions of this invention the skiving knife may readily cut through, or pass just below, the interlaced yarn portion of the fabric, leaving at least portions of the interlaced yarn structure adhered to, and stabilizing, the microporous layer at the thinnest portion of the skived zone (as in a shoulder scarf, or grooved scarf), permitting formation of a smooth stable, strong fold without the need for insertion of an adhered reinforcing tape at the inside of the fold. The napped bonded construction makes it possible to control the skiving and to avoid the marked tendency for the direction of the cut to be deflected upwards or downwards of the plane of the interlaced fabric which occurs when conventional fabrics are used.

While the reasons for the greatly improved skivability of the materials of this invention are not clearly understood, it is believed that the bonding together of the nap fibers acts to stabilize and reinforce the fabric structure so that when the knife edge is pressed against the fabric the yarns do not tend to move away, relatively, from the knife edge or be displaced from their previous positions by the pressure of the knife, causing deflection of the direction of the cut. Some bonding of surface portions of the yarns to each other and/or to nap fibers may also contribute to this effect. It is noteworthy that even where the later bonding to yarn surfaces takes place, as when a nap-impregnating binder is employed, the presence of the nap tends to prevent substantial filling of the spaces or hollows present at or near yarn intersections (see FIGS. 18 and 21) and the structure is not stiffened appreciably, certainly not to the extent that is observed when the same binder is applied to the surface of the same fabric before napping.

Products made from the napped bonded fabric have also been found to be outstanding in their shoe-making characteristics other than the good skiving and folding characteristics discussed above. They attain a very high combined score when rated on their behavior in the following operations of significance in shoe making: cutting (with relatively blunt leather dies), stitching, component adhesion (using conventional latex adhesives, e.g. to adhere stiffeners or "plumpers"), lasting (conformability), roughening (such as resistance to "orange-pell" formation on lasting, and ability to produce a really smooth patent surface), a roughing (in preparation for sole attachment). They are so highly resistant to fraying on wear that they may be used in unlined shoes without special protection of the cut edges of the material. Fraying characteristics may be tested in the following manner: the material is die-cut to form a 3 inch diameter circle or a 2×4 inch rectangle and 8 to 16 such pieces are placed in a smooth surfaced cylindrical container having an internal volume of one gallon and an internal diameter of 7⅝ inches (e.g. a laboratory ball mill of 1 gal. capacity) along with a 5 inch long 2 by 2 inch rectangular piece of pine having rounded edges; the container is then rotated on its axis at 78 rpm for a period of up to 24 hours at room temperature. Typical samples of the product resist showing any fraying, visible to the naked eye, even after test periods well over 4 hours, such as 12 or 24 hours. In preferred products the degree of napping is such as to substantially obscure the underlying fabric weave pattern; the fraying test described above may also be used to test the wear-resistance of this effect. Thus, if the nap-bonding treatment is omitted the fabric weave pattern will usually become evident in the foregoing test before the 24 hour test period is over, while the bonded nap will still have its weave-obscuring effect. See FIGS. 24 (unbonded nap before test), 25 (unbonded nap, after 24 hours test), 26, (bonded nap before test), and 27 (bonded nap after 24 hours test), which are views looking down onto the nap with an ordinary light microscope, the product being that of Example 20 below; in the same test the product having the bonded nap shows no "pilling" even though it contains pilling-susceptible polyester fibers, while the product having the unbonded nap shows marked pilling when examined after 4 hours of test.

It is preferred that the fabric be tightly woven (or tightly knitted) so that there are at least about 3000 yarn cross-overs per square inch (thus the 60 × 60 woven fabric previously described has about 3,600 yarn cross-overs per square inch, while the described 80 × 40 woven fabric has about 3,200 yarn cross-overs per square inch). The thickness of the nap is preferably within the range of about 0.1 to 0.5 mm or 1 mm such as about 0.2 to 0.4, 0.5, 0.6 or 0.7 mm and the weight of fiber in the nap is preferably within the ranges of about 0.1 or 0.3 to 1 ounce per square yard, such as about 0.2, 0.3 or 0.5 oz. per square yard. As indicated, each yarn preferably is made up plurality of substantially parallel fibers (generally well over 10, such as 50 or more; the number of filaments can be counted in the illustrated cross-sections) and the yarns are preferably twisted, e.g. to well over one turn per inch, such as 2 to 5 turns per inch. Best results have been obtained to date with woven fabrics in which have at their smooth face repeating, numerous exposed lengths of yarn which span two or more transverse yarns e.g. satin or sateen weaves. It is, however, within the broader scope of the invention to use square weaves (e.g. sheeting), drills, twills, etc.

Napping often increases the number of cross-overs, as by removing portions of filling yarns so that widthwise shrinkage occurs (see Example 18 below, in which the number of cross-overs of the fabric increased by about 10% as a result of the napping). Preferably the fabric is so constructed that after napping it has a trouser tear strength (ASTM751-68T) of about 5 pounds, and still more preferably at least about 7 pounds such as 7 to 9 or 10 pounds, and an elongation at break of at least 10% such as 15 to 20% or more. It is also preferable that it have a modulus at 5% elongation (ASTM D-2208) in the range of about 5 to 30 lb/in., that it be sufficiently resilient to recover substantially completely from an elongation, by stretching, of about 2% preferably even from an elongation of about 5% (in the warp or filling direction).

The fabric, particularly when it contains thermoplastic fibers, is preferably given a heat-setting treatment to stabilize its configuration at the highest temperature to be encountered in the laminating process, e.g. a heat-setting treatment (while the dimensions of the fabric are maintained constant, on a tenter frame) at a temperature about 30° C above said highest temperature, such as a temperature of about 235° C for a fabric which is to be vinyl coated in a process using a plastisol-fusing temperature of 205° C. This heat-setting may be effected before or, preferably, after napping and may if desired be effected after, or coincident with, the nap-bonding treatment, such as during the curing or setting of the nap-bonding agent.

As previously indicated, the fabric may contain such fibers as cotton, polyester or nylon. Other figers such as rayon, acrylic, (e.g. polyacrylonitrile), or polyolefin (e.g. isotactic polypropylene) may also be employed alone or in blends of two or more types of fibers. Certain fabrics tend to shrink considerably when exposed to elevated temperatures, e.g. 140° C (such as are used in some of the Examples, below) for setting the adhesive or the nap bonding agent. With such fabrics, e.g. of polypropylene fibers one can employ known adhesives and bonding agents which are suitable for use at lower temperatures such as those which set quickly to a strong condition on simple evaporation of solvent or diluent, or those which contain sufficient catalyst to cure in a short time at a relatively low temperature; or one can allow a longer time for curing to occur with the particular disclosed agents, e.g. one can pass the assemblage through an oven at a temperature at which the substantial shrinkage does not occur (such as 55° or 60° or 70° C) to evaporate any solvent or diluent and then allow full curing to occur on storage for a few days.

In the accompanying drawings:

FIGS. 21 to 23 are similar views of another product of Example 19;

FIGS. 26 and 27 are photomicrographs, taken with an ordinary light microscope, of a product of Example 20 before and after an abrasion test; and FIGS. 24 and 25 are similar views of a similar product whose nap is, however, unbonded.

FIG. 28 is a schematic view of a skiving operation.

Figure 20:
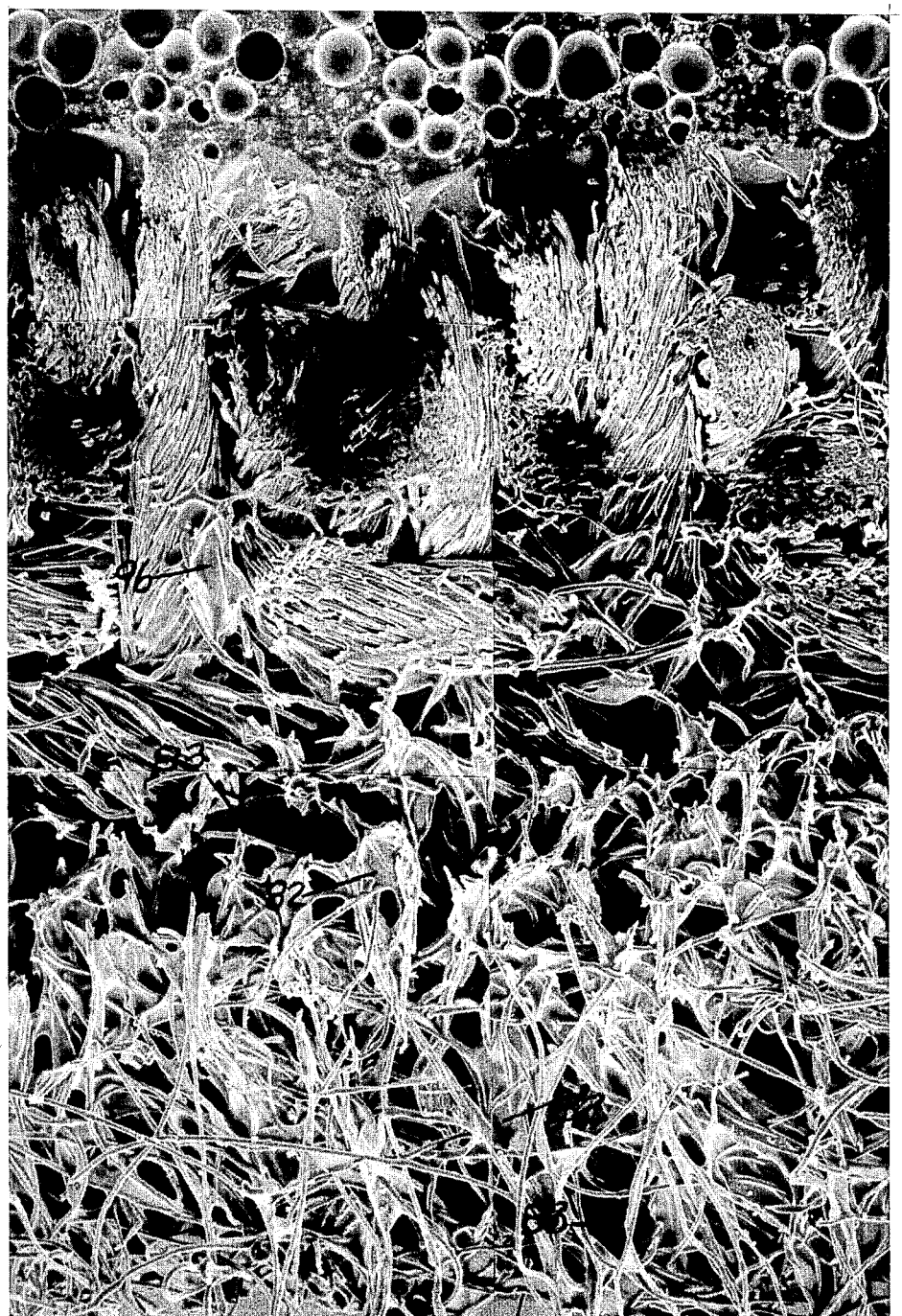

FIG. 20 A is a schematic view showing the cut edge of a sample and the angle at which it is viewed.

FIG. 1A is a photomicrograph of a filling yarn taken from a napped fabric used in this invention.

Figure 2:
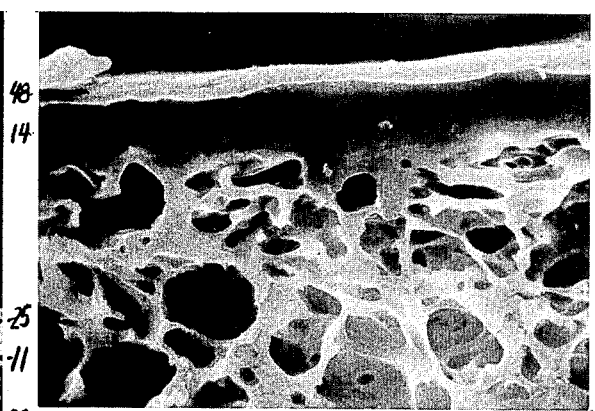

FIG. 2A is a photomicrograph of the same yarn after part of its napped has been cut off with a hand scissors (for the purpose of weighing the resulting cut fibers).

Figure 3:
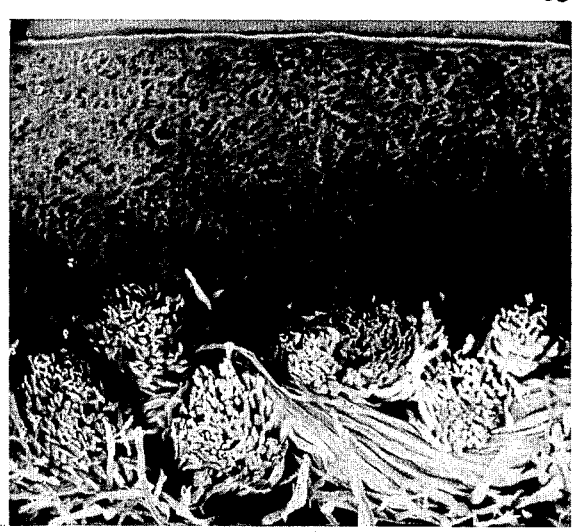

FIG. 3A is a photomicrograph, taken with a scanning electron microscope ("S.E.M."), of a cut edge of a anp impregnated napped fabric.

Figure 4:
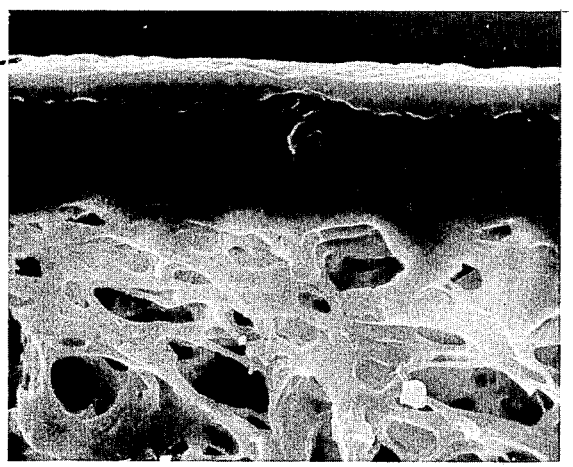

FIG. 4A is a S.E.M. photomicrograph looking down at the nap-impregnated face of that fabric.

Figure 5:
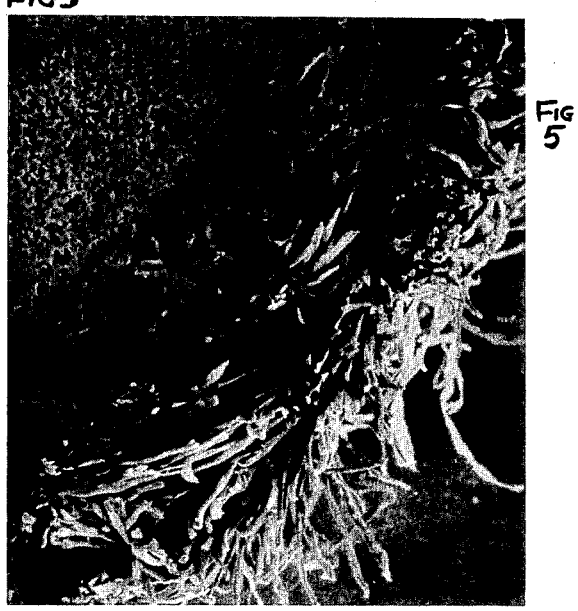
Figure 12:
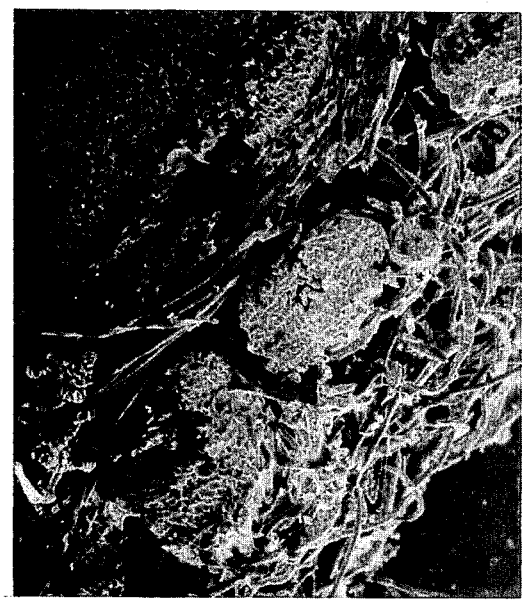

FIG. 5A is a S.E.M. photomicrograph of the un-napped face of that fabric.

Figure 6:
Figure 10:
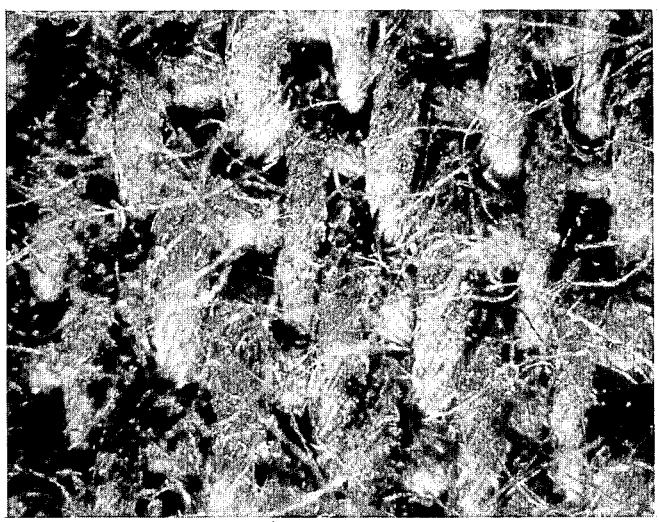
Figure 6A:
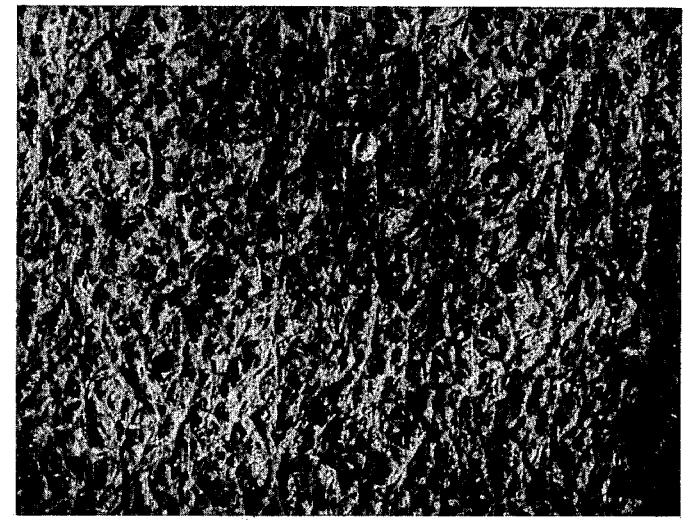

FIG. 6A is a photomicrograph, taken (like FIGS. 1A and 2A directly with a camera having a magnifying lens, of the nap-impregnated face of that fabric.

Figure 7:
Figure 8:

FIGS. 7A and 8A are photomicrographs (also taken directly with a camera having a magnifying lens, under two different lightning conditions 1 of the abrasive face of sandpaper used in the Examples below.

Figure 9A:
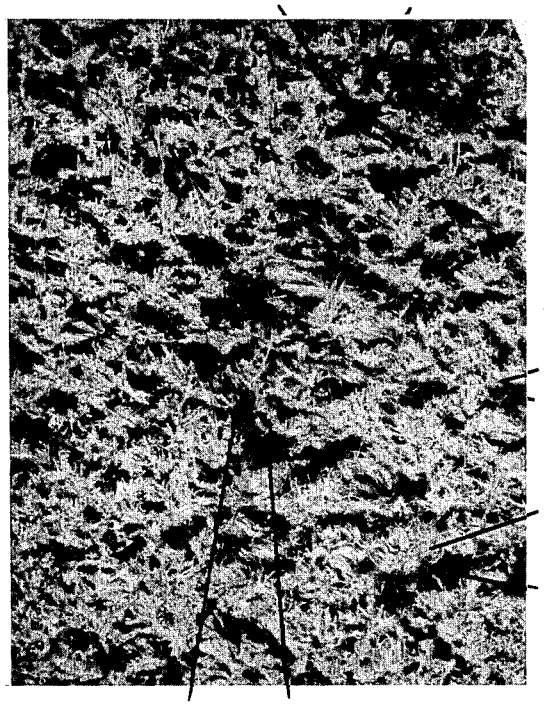
FIG. 9 is a photomicrograph of a face of a fabric layer after the fabric has been stripped from the structure shown in FIGS. 1-8.
Figure 10A:
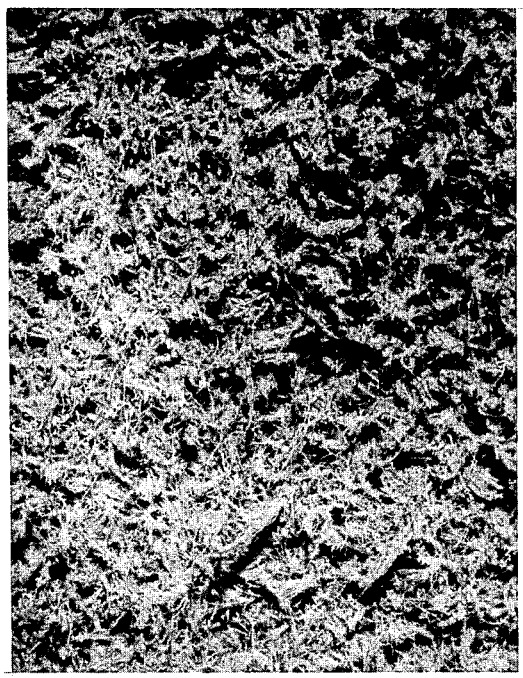

FIGS. 9A and 10A are photomicrographs (taken like FIG. 6A) of the nap-impregnated face of the product after sanding as described below; FIG. 9A shows the clumps of tufts brushed up, in raised position, while FIG. 10A shows them brushed down.

Figure 11:
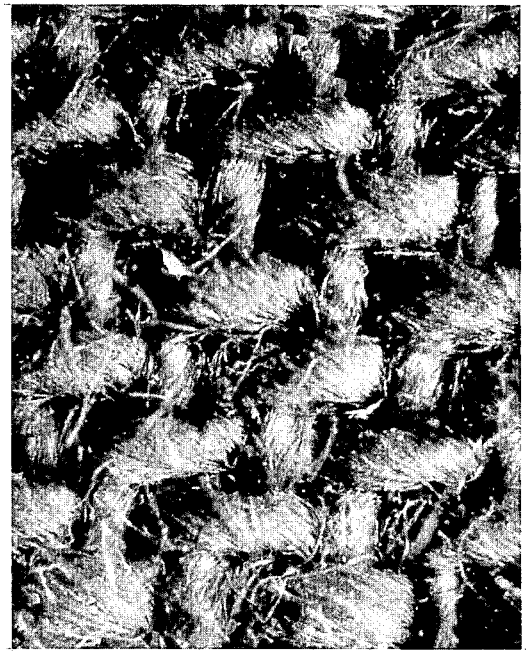
FIG. 10 and 11 are photomicrographs of both faces of the fabric used to make the structures shown in FIGS. 1 to 8.

FIG. 11A is a S.E.M. photomicrograph of the nap-impregnated face of the sanded product.

Figure 12A:
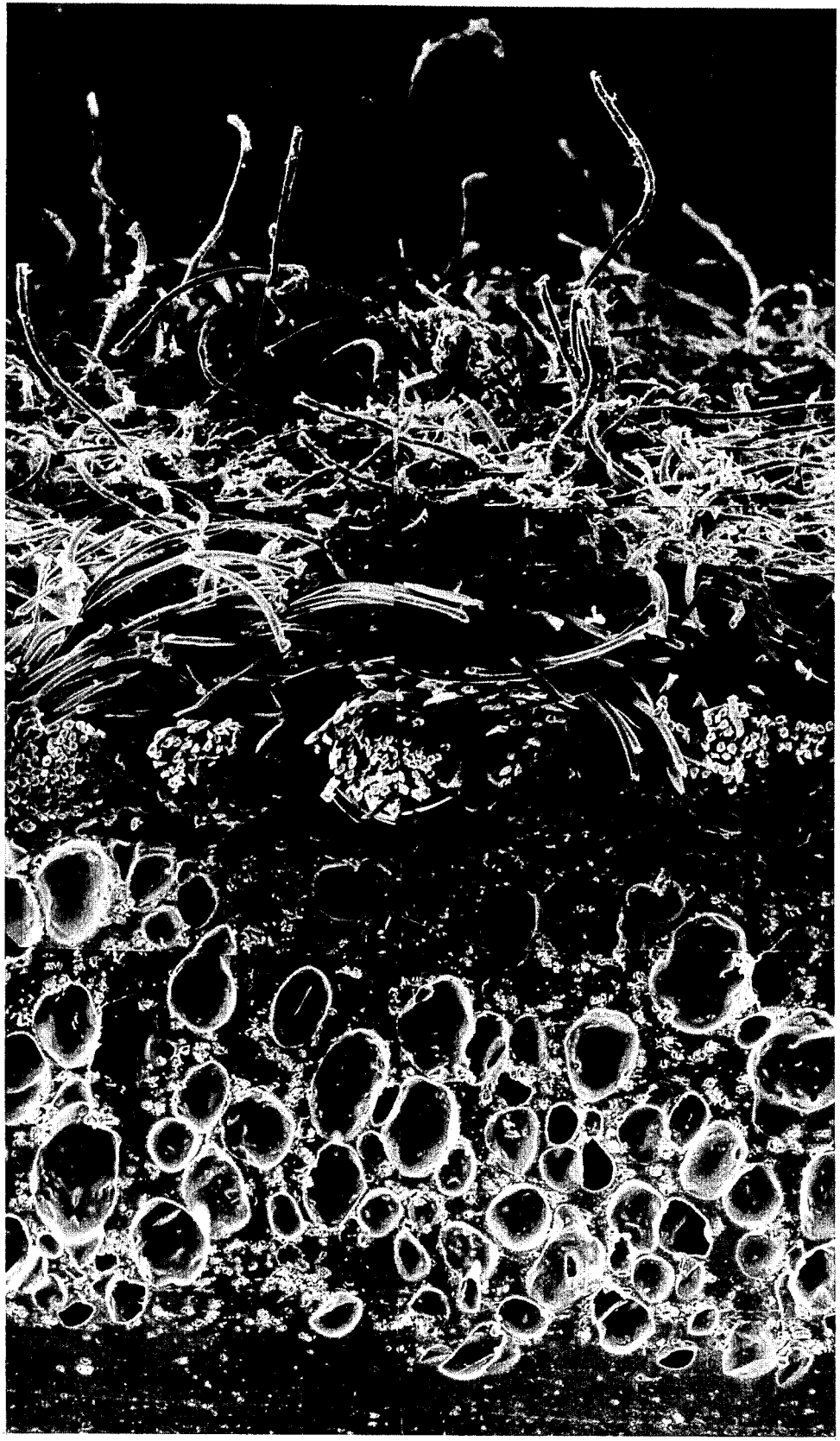

FIG. 12A is a S.E.M. photomicrograph of a cross-section (i.e. a cut edge) of the sanded product of Example 1A.

Figure 13:
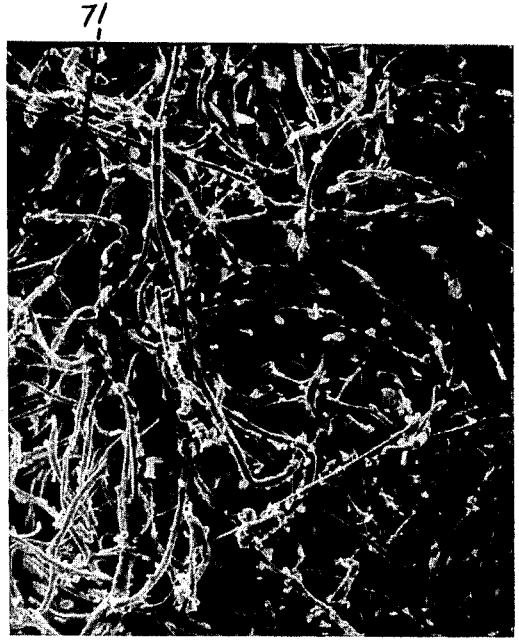
FIG. 13 is a photomicrograph of the napped, impregnated face of the fabric used to make the structure shown in FIG. 12.

FIG. 13A is a S.E.M. Photomicrograph of part of a cross-section (i.e., a cut edge) of a product described in Example 5a hereof.

The following Examples are given to illustrate the invention further. In the Examples all pressures are atmospheric unless otherwise indicated. In the application all proportions are by weight unless otherwise indicated.

Examples 1 to 17 below are copies of the corresponding Examples of said parent application Ser. No. 398,696.

EXAMPLE 1

A pigmented 15% solution of thermoplastic elastomeric polyurethane in a solvent mixture of 55% N,N-dimethylformamide ("DMF") and 45% acetone is deposited (by knife coating) at a wet thickness of 3 to 4 mils (0.075–0.1 mm) on a sheet of embossed release paper. The polyurethane is of the type described in Example 1 of U.S. Pat. 3,637,415 and the amount of pigment (e.g. Superba carbon black) is about 20% of the amount of polyurethane in the solution. The deposited layer is exposed to the atmosphere to permit evaporation of some of the solvent for about 30 seconds, so that it has a tacky surface, and is then laminated to a self-sustaining thin sheet of microporous elastomeric polyurethane (which is soluble in DMF) by passing the coated release paper and the microporous sheet through a nip (of a steel roll and a rubber-covered roll) with the microporous sheet in contact with the coating using light pressure (e.g. about 1 pound per lineal inch of nip) and applying as little tension as possible to the microporous sheet. The assemblage is then heated in an oven for one minute at 290°–320° F (about 140°–160° C). This removes the solvent and bonds the coating firmly to the paper. The heating may be carried out in two successive ovens, one at 250°–280° F; the second at 290°–320° F. A solvent-containing curable adhesive is then applied to the free surface of the microporous sheet and a portion of the solvent is allowed to evaporate in the atmosphere for 1 minute to decrease the flowability of the adhesive and increase its tack. Directly thereafter the adhesive coated material is laminated to a sheet of cotton sateen fabric (unnapped sateen weighing 250 g. per square meter [i.e., 1.21 60-inch yards per pound] and having a thickness of about 0.5 mm). Lamination is effected by passing the material through a nip (of a steel roll and a rubber-covered roll) with the fabric in contact with the adhesive coating, using a pressure (e.g. 3 to 10 pounds per lineal inch) such that the adhesive layer is molded into firm adhesive contact with the surfaces of the upper portions of the exposed yarns.

The resulting laminate is then heated in a circulating hot air oven at 280°–320° F for a time sufficient to substantially remove all the solvent from the adhesive (e.g. for 1 to 5 minutes), and to partially cure the adhesive.

The release paper is then mechanically stripped from the laminate while winding the laminate into roll form with its fabric layer facing outward, and the laminate is allowed to stand in the atmosphere for a time sufficient for the adhesive to cure substantially completely, (e.g. for 72 hours).

The microporous sheet is about 0.5 mm in thickness and has a specific gravity of about 0.35 g/cm$^3$. It is produced by cutting off the upper layer of a two-layer sheet of the type illustrated in U.S. Pat. No. 3,637,415. A single layer sheet of the same type may be produced in the manner described in Canadian patent 865,008. The residual salt content of the microporous sheet is below 0.2%.

The curable adhesive is a commercial two component system, whose components are mixed just prior to use; the mixture is applied to the microporous layer in any suitable manner, as by knife coating at a wet thickness of about 0.1 mm. One component is 100 parts of a 30% solution in a 60% acetone/40% DMF blend of Impranil C, a hydroxyl-terminated polyester, while the other component is 5 parts of a 75% solution in ethyl acetate of Imprafix TH, a prepolymer having terminal isocyanate groups (a polyfunctional adduct of toluene diisocyanate and a polyol). When mixed and allowed to cure it forms a cross-linked elastomeric polyurethane; curing may be accelerated by including a catalyst (such as 1–5 parts of Imprafix BE) in the mixture and/or by heating.

If the same solvent-containing adhesive is applied to the same microporous sheet as such, not bonded to a backing, the sheet swells and distorts extensively.

Details of the Impranil-Imprafix System are given in the article by Glenz and Kassack in Tinctoria Vol. 59 (1962) pages 245–249. Another two-component system, of the same type, is a mixture of Witco Chemical's Witcobond 202 and Witcobond XB

EXAMPLE 2

Example 1 is repeated except that one face of the microporous sheet is pretreated with water so that (when that face is brought into laminating contact with the coated release paper) the microporous sheet carries about 10–30% of water (based on the weight of the polyurethane); the release paper is S.D. Warren Company's "Transkote FER" which is a "vinyl paper") and the time in the oven (directly after the assemblage of coated release paper and wet microporous sheet pass through the nip) is extended (e.g. to 1 ½ – 2 minutes) to fully evaporate the water therefrom prior to the application of the adhesive.

The resulting product has a much better water vapor transmission than the product of Example 1. Its WVT is about 27 g/m$^2$/hr. as compared to about 8–10 g/m$^2$/hr for the product of Example 1. The WVT of the structure at an intermediate stage prior to the application of the adhesive (i.e. as measured on a structure produced by stripping off the release paper before any adhesive is applied to the free, microporous, side) is about 45 g/m$^2$/hr as compared to 11–13 g/m$^2$/hr for the corresponding intermediate structure of Example 1.

The prewetting of the microporous sheet is effected by applying to the upper face of the sheet (in flat, horizontal condition) water, at a temperature of about 40° to 60° C (say 50° C) containing about 0.005–0.01% of Aerosol OT (a surfactant, sodium salt of dioctyl sulfosuccinate) allowing the water to soak into the sheet for 10–30 seconds (e.g. 20 seconds) and squeegeeing off surface moisture directly thereafter.

EXAMPLE 3

Examples 1 and 2 are repeated except that after application of the adhesive the assemblage is passed through an oven to remove substantially all solvent (e.g. an oven at 65° C). Then the dried adhesive surface is heated (e.g. with radiant heat) to cause it to soften and become tacky (e.g. at a temperature of about 90°–120° C, such as 110° C). The fabric is then immediately brought into contact with the tacky adhesive and the assemblage passed through the nip as described in Examples 1 and 2.

EXAMPLE 4

Examples 1 and 2 are repeated except that as the adhesive there is employed a thermoplastic elastomeric polyurethane (such as Estane 5701) of lower melting point than the polyurethane of the microporous layer, the adhesive being applied as a 25% solution in 50/50 acetone/DMF. The solvent is removed by evaporation and heat is applied to the adhesive layer to raise its temperature above its softening point and make it tacky (e.g. to a temperature of about 135°–170° C) and the fabric is then immediately brought into contact with the tacky adhesive and the assemblage passed through the nip as described in Examples 1 and 2.

EXAMPLE 5

Example 1 is repeated using as the release paper S.D. Warren Co. "Transkote Patent AV:, "Hi calf" grain, a polyurethane casting paper. After the adhesive has fully cured a two-package clear elastomeric cross-linked polyurethane coating is applied to the exposed surface of the skin by dip coating or reverse roll coating to produce a high gloss patent leather type of finish.

The amount of coating material applied is such as to produce a clear top coat 15 to 30 microns in thickness on drying and curing. The formulation of the clear coating is a mixture of Permuthane 20-249-100 and Permuthane V5822-70 in 0.7 :1 ratio, diluted to 25–35% solids with methyl ethyl ketone.

EXAMPLE 6

Examples 1 and 2 are repeated and after the adhesive has fully cured there is applied, to the exposed surface of the skin, a topcoat of an elastomeric polyurethane having a higher modulus than that of the polyurethane of the skin. The topcoat may be applied by gravure printing a 10-15% solution of Permuthane U 10-011 in 50/50 toluene/methyl cellosolve and then heating in an oven at 160° C for a short time (e.g. 1 to 1 ½ minutes) to evaporate the solvent, the coating being applied in such amount as to deposit about 3 to 5 grams of polyurethane per square meter.

EXAMPLE 7

Example 1 is repeated, except that the Impranil C is supplied in a solution free of DMF, the solvent being a mixture of 80% acetone (which evaporates rapidly) and 20% methyl cellosolve acetate (which evaporates more slowly and is still present in the adhesive layer when the desired tack is attained by evaporation. Both of these are swelling agents for the microporous layer.

EXAMPLE 8

Example 7 is repeated except that the 6.5 ounce per yard ($220$ $g/m^2$) fabric having a lightly impregnated nap, described above and shown in FIG. 13 is used in place of the cotton sateen.

EXAMPLE 9

Figure 14:
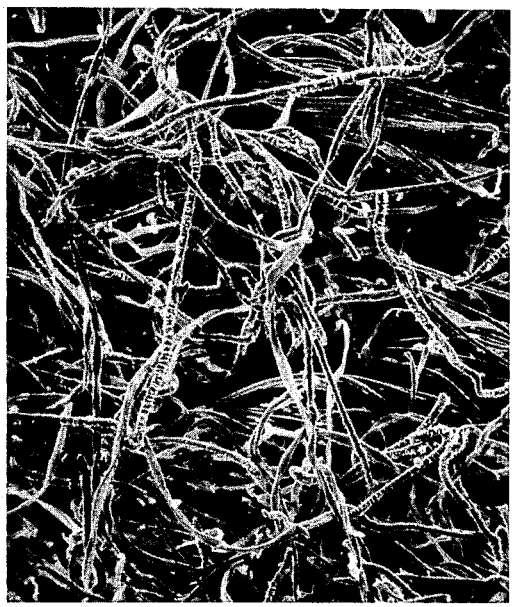
FIG. 14 is a photomicrograph of the napped face of another fabric.

Example 7 is repeated except that the unimpregnated napped 8.5 oz. per square yd. ($290$ $g/m^2$) fabric described above and shown in FIG. 14 is used in place of the cotton sateen.

EXAMPLE 10

Example 7 is repeated except that the napped 8.5 oz. per square yd. ($290$ $g/m^2$) fabric described above on is used in place of the cotton sateen. Thereafter the nap is knife-coated with about 10g (solids basis) per square meter of a two-component solvent-containing polyurethane adhesive blend similar to the adhesive described in Example 7 but employing a softer polyurethane (specifically a mixture of: 100 parts of a 30% solution, in 80/20 acetone/methyl cellosolve acetate, of Impranil CHW, a hydroxyl-terminated polyester; 5 parts Imprafix TH; and 5 parts Imprafix BE) and then heated for 2 minutes at 150° C after which the adhesive layer and nap coating or bonding agent are allowed to cure fully, while the material is at rest, for say 72 hours at room temperature.

Figure 15:
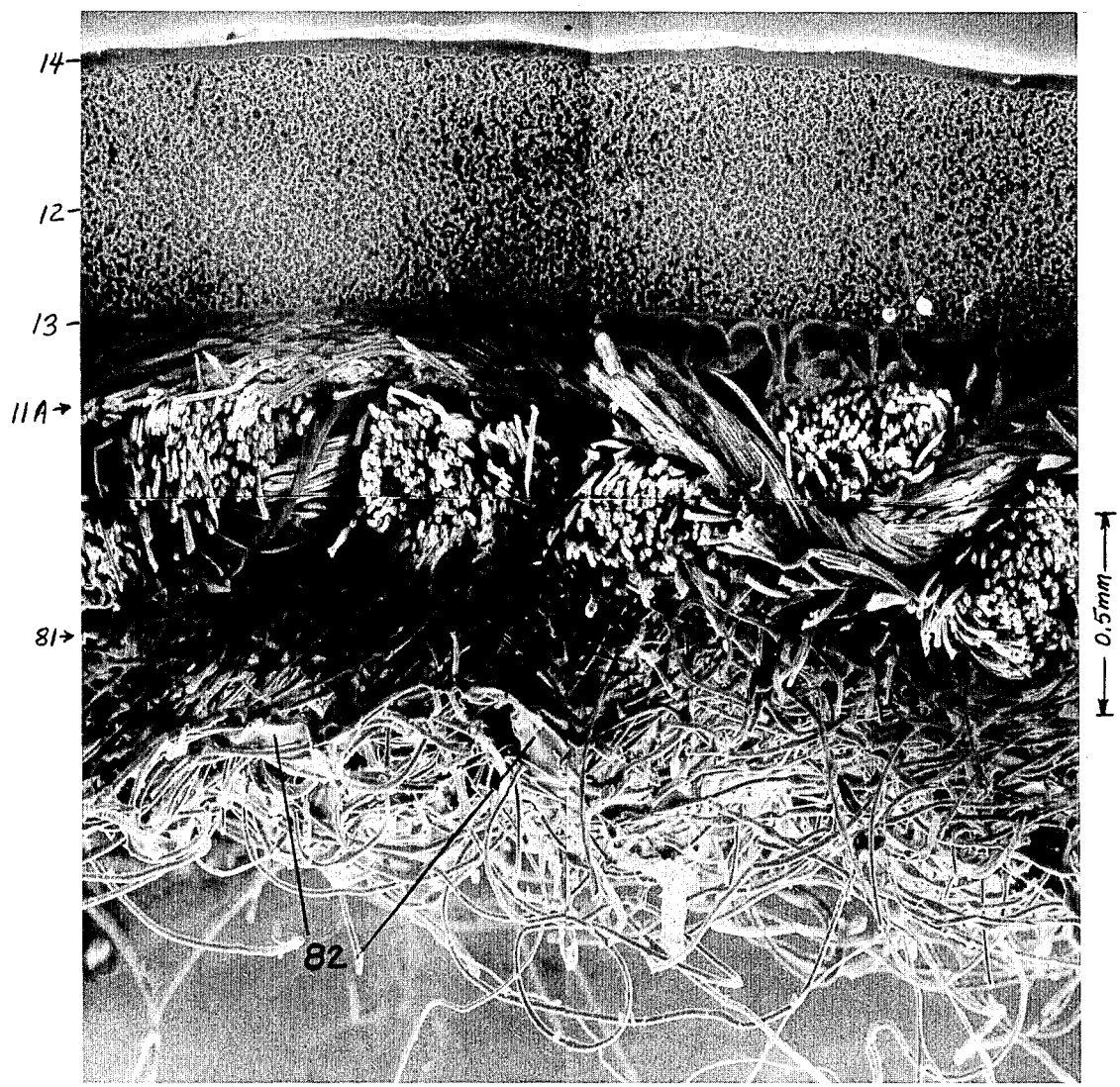
Figure 9:
Figure 17:
FIG. 17 is a photomicrograph of the napped impregnated face of the fabric of the structure shown in FIGS. 15 and 16.
Figure 16:

The resulting structure is shown in FIGS. 15 to 17; FIGS. 15 and 16 are cross-sections, FIG. 16 showing a cross-section in a plane at right angles to that of FIG. 15; and FIG. 17 is view of the bottom (impregnated) face of the fabric. It will be seen that the structure is similar to that shown in FIGS. 1, 2, 5-11 in that there is a layer of woven fabric 11A, a layer of microporous elastomeric material 12, an elastomeric adhesive 13 bonding the lower face of the microporous layer to the upper face of the fabric and a skin 14 of film-forming polymeric material on the upper face of the microporous layer, the adhesive 13 being in contact with the upper surface of the fabric and the fabric being substantially non-impregnated by the adhesive. FIG. 15 shows a warp yarn (running parallel to the plane of the picture) and the cross sections of a total of five filling yarns (running in a direction transverse to the picture). In FIG. 16 a filling yarn runs parallel to the plane of the picture and the cross sections of some ten warp yarns are also evident. The adhesive deposit is quite thin, like that seen in FIG. 1 described earlier, and its character is like that described earlier in connection with FIGS. 1, 6 and 7. Thus the space between the very uppermost positions of the warp yarn seen in FIG. 15 is largely free of adhesive, and the uppermost portion of filling yarn (seen to the right of FIG. 15) makes very little contact with the adhesive layer, there being fingers of adhesive extending down into adhesive contact with said uppermost portion of the filling yarn, probably as a result of the retraction of the layers immediately on release of the laminating pressure and consequent exertion of tension on the adhesive layer to pull adhesive fingers therefrom, leaving open-celled voids between the adhesive on the microporous layer and the top of the fabric and thinning out (or removing portions of) the adhesive layer on the microporous layer. (FIG. 16 may give a false impression, at first glance, that there are some individual fibers extending upward into the microporous layer; these fibers are, of course, stray fibers, resulting from the sectioning operation, which happen to have been moved, after sectioning, into positions in front of the plane of the cross-section).

Unlike the structure shown in FIGS. 1, 2, 5-11 the fabric has a substantial low-density nap layer 81 extending down from the interlaced yarn structure; in this case the nap layer has a thickness comparable to that of the interlaced yarn structure. The elastomeric bonding agent or impregnant has, in this case, not penetrated to the interlaced yarns; see the thin webs of impregnant 82 which join and bridge neighboring fibers but do not form a continuous pore-free layer, there being large impregnant-free spaces 83 between many of the fibers.

EXAMPLES 11 AND 12

Examples 8 and 9 are repeated, except that in each case the fabric has 60 warp yarns per inch and 60 filling yarns per inch, the weight of filling yarns being about half of the total weight of the fabric (before any napping or impregnation).

EXAMPLE 13

Example 10 is repeated except that the microporous layer is about 0.6 mm thick and the fabric is a sateen fabric (having 60 warp yarns per inch and 60 filling yarns per inch, each of which is a 75/25 polyester/cotton staple fiber blend, said fabric weighing 8.5 oz/yd² ($200$ $g/m^2$) and having been napped so that its thickness in the final impregnated laminate is about 0.75 mm, of which about 0.25 mm is in the nap.

The resulting thicker composite, about 1.4 mm thick, is more suitable for making lasted men's shoes while the products of the other Examples are more suitable for lasted women's shoes.

EXAMPLE 14

The napped 8.5 oz. per square yard ($290$ $g/m^2$) fabric described on page 25 is vinyl coated in the following manner. A vinyl plastisol is applied in a thin layer (0.25 mm thick) on vinyl paper and heated to 175°-180° C to form a gelled skin, then a vinyl plastisol containing a blowing agent is cast thereon, at a thickness of 0.53 mm and heated at at temperature of 175°-180° C to gel it and make it tacky, after which the fabric is laid lightly onto the foamable gelled plastisol with the smooth surface of the fabric in contact with said tacky surface and the whole assembly is heated for 1 minute at 205° C to cause blowing (blow ratio 2:1) and fusing. Thereafter the assembly is cooled and stripped from the vinyl paper, and the nap of the fabric is knife-coated as in Example 10.

The plastisol used for the skin contains 45 parts diisodecyl phthalate, 10 parts diisodecyl adipate, 100 parts polyvinyl chloride (dispersion grade, 1 to 3 micron particle size), 10 parts fine calcium carbonate ("Duramite"), 3 parts stabilizer (zinc, cadmium, barium naphthenate), together with about 7% (of the total weight) of dispersion of pigment in plasticizer.

The foamable plastisol contains 28 parts diisodecyl phthalate, 23 parts diisodecyl adipate, 100 parts of polyvinyl chloride, 35 parts of fine calcium carbonate (Duramite), 1 part of stabilizer (Vanstay 6201), 1.6 part of a mixture of equal parts of a finely divided blowing agent (such as azodicarbonamide), a liquid plasticizer (such as dioctyl phthalate), and a heat-stabilizer which also serves as a blowing activator, and about 4% (of the total weight) of dispersion of pigment in plasticizer.

EXAMPLE 15

Examples 10 and 14 are repeated except that in each case the fabric is a sateen fabric having 60 warp yarns per inch and 60 filling yarns per inch, each of the yarns being of a 75/25 blend of polyester/cotton stable fibers, said fabric weighing 7 ounces per square yard (240 g/m$^2$), said fabric having been heat set at 240° C and napped to bring about 10% of its weight (about 20% of the weight of the filling yarns) into the nap.

EXAMPLE 16

Example 15 is repeated except that in each case the yarns are of 100% polyester staple fiber.

EXAMPLE 17

Example 15 is repeated except that the proportions of cotton and polyester fiber are 50/50 rather than 75/25 and the weight of the fabric is about 8 ounces per square yard (270 g/m$^2$).

The polyester fiber in the foregoing Examples is polyethylene terephthalate. The fabrics, after napping, have a tongue tear strength (ASTM D-751-68) of at least about 7 pounds (preferably in the range of about 10 to 15 pounds) in both the warp direction and the filling direction. The grab tensile strength (ASTM D-2208-64) of the fabrics is at least about 75 pounds (preferably in the range of about 100 to 150 pounds) in both said directions. This assures sufficient strength for the conventional shoe making operations.

EXAMPLE 18

This Example illustrates the effect of the napping on the fabric structure and properties. A 4/1 sateen weighing about 6.5 to 7 ounces per square yard and composed of yarns of a blend of 75% polyethylene terephthalate and 25% cotton, with 44 filling yarns per inch and 80 warp yarns per inch, the filling having more fiber than the warp yarns, is napped on that face which has a preponderance of filling yarns. As a result of the napping the width of the fabric, originally 62 inches, decreases to 57 ½ inches, the weight per square yard rises to 7.66 ounces, the number of warp yarns per inch rises to 90 while the number of filling yarns per inch remains at 44. Thus the napping operation, which pulls portions of the filling yarns from the main fabric structure to form the nap, brings the warp yarns closer together and shrinks the fabric about 10%, increasing the crimp of the filling yarns. The napped fabric has the following characteristics (for references, see the Wellington Sears Handbook of Industrial Textiles by Ernest R. Kaswell, pub. 1963 by Wellington Sears Company, Inc., N.Y., the appropriate pages of that book are given in parentheses below): gauge, thickness 0.026 inch (pages 571-2); contraction, warp 3.88%, filling 10.30% (page 454); crimp, warp 4.04%, filling 11.60% (page 454); yarn no., warp 19.03/1, filling 7.86/1 ("indirect" pages 411-412, non-metric); grab strength, warp direction 244 pounds, filling direction 196 pounds (ASTM grab, Instron machine having jaws padded with rubberized duck, pages 470-471); elongation at break, warp direction 28.77%, filling direction 41.10% (pages 559-561); tongue tear strength, warp direction 31 pounds, filling direction 34 pounds (Scott J machine, pages 489-492); trapezoid tear strength, warp direction 61 pounds, filling direction 47 pounds (Scott J machine, page 493); bursting strength 367 pounds per square inch (Mullen tester pages 474-477).

The fabric of Example 18 is somewhat unbalanced in construction and the unbalance is increased by the napping. It is often preferable to use a fabric having a more balanced construction, one having about the same numbers of warp and filling yarns per inch, e.g. 80 warp yarns per inch and 80 filling yarns per inch.

Where the fabric is to be exposed to elevated temperature during the process of manufacturing the product (e.g. in the processes of the foregoing Examples 8-17) it is preferable, in accordance with conventional practice, to have the fabric heat-set before using it in the laminating process so as to avoid undesirable heat-shrinkage during the process. For instance the heat-setting may be effected in well known manner to produce a fabric which has little shrinkage, e.g. a shrinkage of less than 2% in the lengthwise (machine) direction and less than 1% in the crosswire direction when subjected (for, say, 3 minutes) to the highest temperature used in the process.

EXAMPLE 19

The napped fabric of Example 18 is heat-set and then vinyl coated as in Example 14. The nap of the resulting vinyl-coated fabric is then knife-coated in a manner similar to that described in Example 10, in two passes. In the first knife-coating pass the fabric travels under tension over rollers and under a coating knife having upstream thereof a bank of the solvent-containing adhesive blend, the coating knife is inclined at an angle to the vertical, the direction of travel being such as to force down the nap to drive the impregnant through the nap to the upper surfaces of the yarns comprising the main woven fabric structure. After this first pass under the coating knife the solvent is evaporated by passing the coated fabric through an oven at about 100° C for about 2 minutes. It is found that as a result of the impregnation in this first pass the weight of the coated fabric has increased from 35.7 oz/yd$^2$ to 36.4 oz/yd$^2$, a net gain of 0.7 oz/yd$^2$, or about 16.6 g/m$^2$ and the thickness of the product (as measured with an Ames gauge which exerts a compacting pressure on the material during the measurement)* has increased from 0.075 inch to 0.083 inch, showing that the nap has increased resistance to compression by virtue of the fiber-bonding action of the impregnant. The second pass is similar except that the blade is disposed in a vertical plane, perpendicular to the fabric, instead of inclined thereto, the conditions being such that the impregnant is not driven down through the nap but remains substantially within the nap. After the solvent has been evaporated in the oven the final curing of the impregnant occurs on standing. The weight of the coated fabric is now 37.7 oz/yd$^2$, a net gain of 1.3 oz/yd$^2$ (or about 57 g/m$^2$ for the two passes). The final thickness (measured under compression as previously mentioned) is substantially the same as that after the first pass (0.083 inch). The second impregnation does, however, give improved resistance to pilling of the nap in long term abrasion tests and lays down and bonds loose projecting nap fibers so that the surface is not as soft to the touch and has the appearance and feel of conventional impregnated non-woven fabrics used as substrates for commercial artificial leather. The adhesive blend used for the knife coating is a mixture of 37.5 parts Impranil C, 85.5 parts acetone and 27 parts methyl cellosolve acetate, to which is added, just prior to the coating operation, 8.5 parts of Imprafix TRL.

* In accordance with ASTM D751-68

Figure 18:
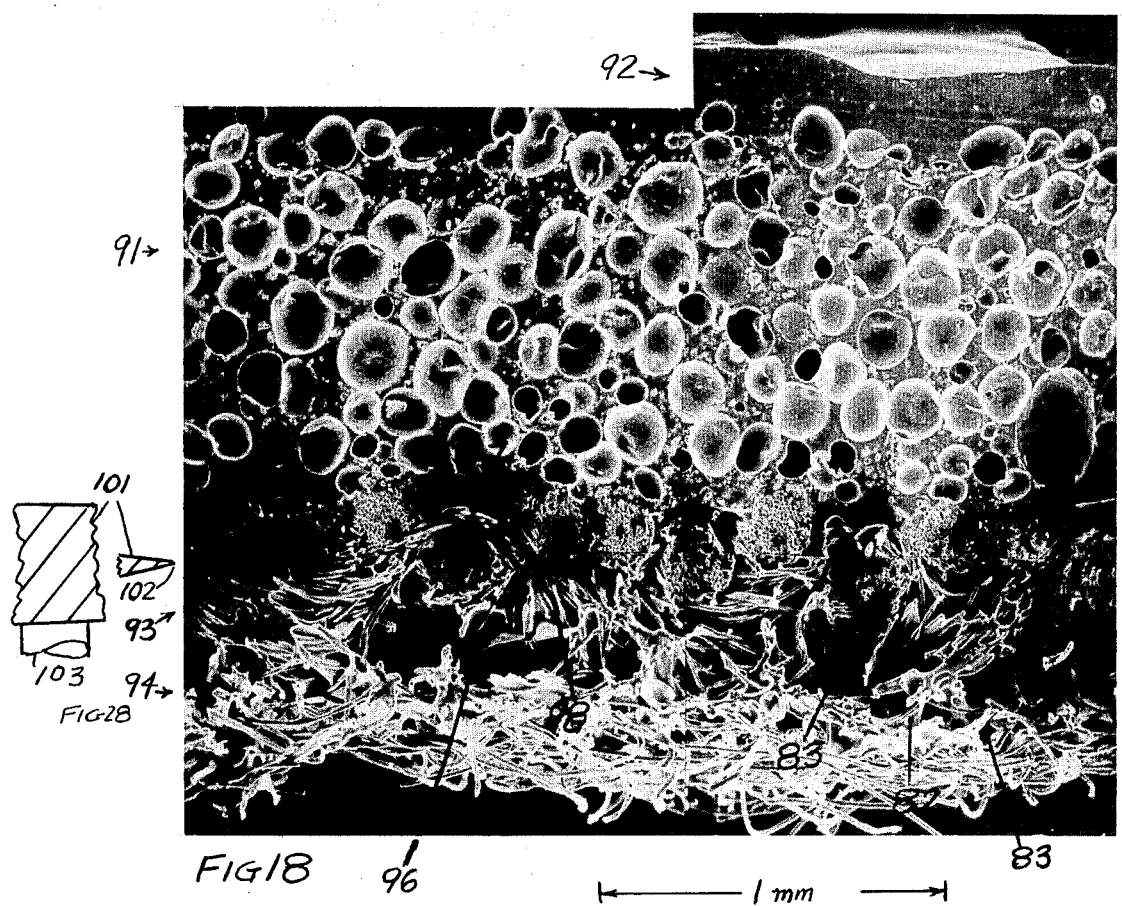
FIG. 18 to 20 are photomicrographs of cut pieces of a product of Example 19, taken (in various directions as described below) with a scanning electron microscope.
Figure 19:
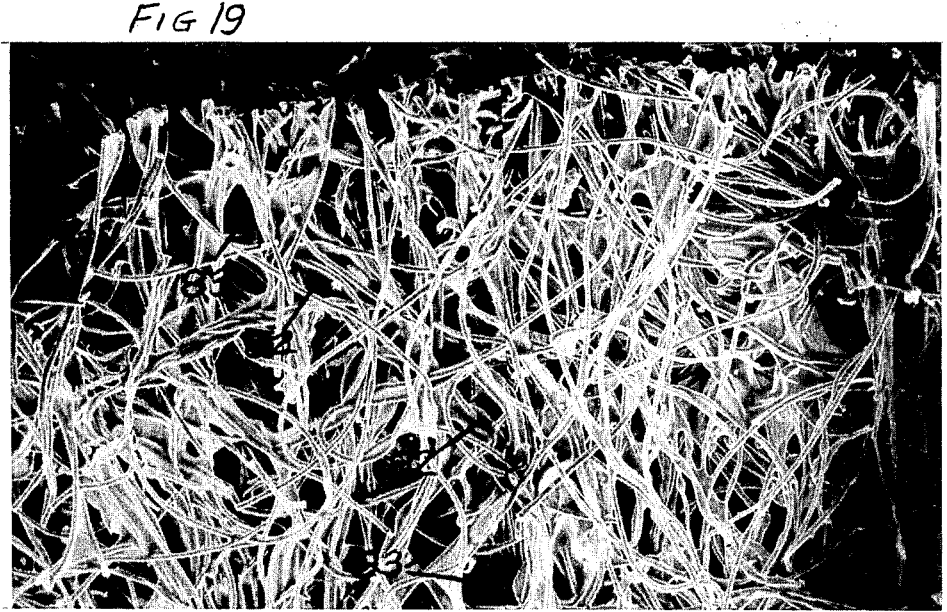
Figure 20A:
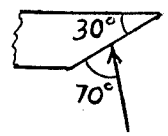

The resulting product is shown in FIGS. 18, 19 and 20. In FIG. 18, which is a view perpendicular to a cross-section cut at right angles to the plane of the fabric, there can be seen the blown layer 91 of vinyl polymer, carrying an unblown skin layer 92, the fabric 93 having an impregnated nap 94, with webs 96 of the impregnant being in contact with both sets of crossing yarns 97, 98. As in FIGS. 15 to 17 there are thin webs 82 of impregnant which join and bridge neighboring fibers but do not form a continuous pore-free layer, there being large impregnant-free spaces 83 between many of the fibers. This is also shown in FIG. 19 which is a view of the bottom (impregnated nap) face of the fabric, taken at an angle of about 45°, with an edge cut at right angles to the face visible at the bottom. It will be seen that the nap in FIG. 19 carries a considerably greater proportion of impregnant than in FIG. 17, but that the structure is still open, having many communicating openings which are greater than 0.05 mm across. Another view of the distribution of the impregnant is found in FIG. 20 which is a view showing a cross-section cut about a 30° angle to the skin face of the laminate which cross section is viewed at an angle of about 70° (see FIG. 20A). The lower portion of this Figure also shows the bottom (impregnated web) face. Webs 96 of impregnant are seen to be in contact with the crossing yarns, and to bond such yarns. While this increases the stiffness of the structure somewhat is also increases its resistance to fraying at a cut edge.

Figure 23:

FIGS. 21, 22 and 23 are similar to FIGS. 18, 19 and 20, respectively, except that they are views of a product made by a process in which the blowing and impregnating steps were under less control and in which there was a subsequent embossing step (the plastisol layers being cast directly onto the fabric instead of the fabric being laid onto plastisol carried by release paper). The resulting product is of a less preferred type, having a heavier deposit of impregnant at the outer surface of the nap and a poorer blown structure. Here, while the webs of impregnant predominate at the surface of the nap (note particularly FIG. 22) the outlines of the individual nap fibers are still clearly evident at that surface which still has the texture of those individual fibers, giving it the feel of a fabric surface, and the nap has numerous open spaces (see FIGS. 21 and 23) and is thus still readily compressible, though much more resistant to compression than the unimpregnated nap. The unimpregnated vinyl-coated fabric used to produce the product of FIGS. 21 to 23 is about 0.058 inch thick (measured under some compression as described above); the first impregnation increases the thickness to about 0.065 inch, while the second impregnation decreases it to 0.062 inch giving a net gain in thickness of 0.004 inch or about 0.1 mm (as compared to the net gain of 0.2 mm in the product of FIGS. 18 to 20). The weight gain as a result of the two impregnations is about 2 oz/yd$^2$ (i.e. about 47 g/m$^2$.

In FIG. 18 there is also indicated, schematically, a circular disc-like skiving knife 101 having a peripheral cutting edge 102, mounted on a rotating shaft 103 and approaching the structure to make a skiving cut.

EXAMPLE 20

This Example employs the napped unimpregnated fabric of Example 18. The nap of the fabric is then impregnated in two knife-coating passes as in Example 19 to deposit a total of about 1.5 to 2 oz./yd$^2$ of elastomeric impregnant after which the un-napped face of the impregnated fabric is then adhered to the microporous sheet face of an assemblage of release paper, polyurethane layer and microporous polyurethane sheet as described in Example 2, using the adhesive described in Example 7.

EXAMPLE 21

Example 20 is repeated except that the microporous sheet material has a thickness of about 0.030 inch (about 0.76 mm).

EXAMPLE 22

In this Example there is employed a 4/1 filling (or weft) sateen weighing (after napping) 6.6 oz. per sq. yd. and composed of yarns of a blend of 75% polyethylene terephthalate and 25% cotton, with about 60 warp yarns per inch and 60 filling yarns per inch, the fabric is heavily napped, the napping elements pulling out fibers primarily from the filling yarns and the extent of napping (as evidenced by the thickness of the resulting nap) being considerably greater than that shown in FIGS. 12 to 23. The napped fabric is impregnated in two passes by knife coating as in Example 19, but using a softer polyurethane. Owing to the thicker nap, having a greater amount of fiber therein, the nap takes up a greater amount of impregnant; the unimpregnated napped fabric has a weight of about 6.6 ounces per square yard, while the nap-impregnated fabric weighs about 9.9 ounces per square yard, so that the weight gain is some 50% of the original weight. The thickness of the napped fabric (measured under compression as described above*) is 0.026 inch (about 0.65 mm) before impregnation and 0.045 inch (about 1.15 mm) thereafter. As in the previously described nap-impregnated fabrics there are thin webs of impregnant which join and bridge neighboring fibers, the outlines of the individual nap fibers are still clearly evident the surface which still has the texture of those individual fibers, giving it the feel of a fabric surface, and the nap has numerous open spaces and is thus still readily compressible, though much more resistant to compression than the unimpregnated nap. The opposite, unnapped, face of the impregnated fabric is then adhered to the microporous sheet face of an assemblage of release paper, polyurethane layer and microporous polyurethane sheet as described in Example 2, using the adhesive described in Example 7. The thickness of the resulting mens-weight shoe upper material is about 1.65 mm. (about 0.065 inch).
* In accordance with ASTM D751-68

The impregnant used in this Example 22 is made by mixing 35.2 parts Impranil CHW, 99.2 parts acetone and 24.8 parts methyl cellosolve acetate and then, just before use, adding 7.8 parts of a concentrated dispersion of carbon black (RBH #5485) and 3.85 parts of Imprafix TRL. Impranil CHW is a hydroxyl-terminated polyester and Imprafix TRL is a polyfunctional isocyanate; these react in situ to form a high molecular weight elastomeric cross-linked polyurethane.

One suitable carbon black dispersion contains 15% of the carbon black, 22.5% of vinyl resin (e.g. vinyl chloride-vinyl acetate copolymer VYHH) and the balance volatile solvents (such as methyl ethyl ketone). Other pigments may be used to impart a uniform coloration to the impregnated napped face.

EXAMPLE 24

Example 22 is repeated except that the fabric has a weight (after napping) of about 8 ½ ounces per square yard, being made of thicker, heavier yarns. The thickness of the resulting mens-weight shoe upper material is about 0.07 inch.

EXAMPLE 25

Example 20 is repeated using, in place of the cotton-polyester fabric, a fabric of 100% isotactic polypropylene staple fibers weighing about 6 ½ ounces per square yard and having a count of about 60 warp yarns per inch and 40 filling yarns per inch after napping. In the process the temperatures (in the ovens used to remove solvent from the impregnated nap and from the adhesive used to join the flat face of the fabric to the microporous sheet) are reduced to about 160° F.

EXAMPLE 26

(a) Example 20 is repeated except that the microporous sheet material is a two-layer sheet having a thickness of 40 mils (about 1 mm) and composed of a 15 mil thick upper layer (whose top surface is in contact with the skin) having a specific gravity of about 0.35 and an integral 25 mil thick more dense lower layer (whose bottom surface is adhered to the fabric) having a specific gravity of about 0.5. A process for producing two-layer products of this type is disclosed in Civardi U.S. Pat. No. 3,637,415.

(b) Example 24 is repeated except that the microporous sheet material is that described in a above.

EXAMPLE 27

A microporous polyurethane sheet material of the type employed in the foregoing Examples 1, 2, etc, is tested for its swelling characteristics in various solvents with the following results:

| Solvent | Initial Weight | Wt. after swelling | % wt. increase on original | % solvent in wet sample |
|---|---|---|---|---|
| A. Acetone | .4438 gm | 1.9300 gm | 335 | 77.0 |
| B. Ethyl Cellosolve Acetate | .4350 gm | 2.2200 gm | 410 | 80.4 |
| C. Mixture of 4 parts A and 1 part B | .4760 gm | 2.3750 gm | 399 | 80.6 |
| D. Methylene Chloride | .4381 gm | 3.8500 gm | 778 | 88.6 |

On a volume basis:

| Solvent | Initial Dimensions cm | Initial Volume cc | Dimensions after swelling cm | cc | % volume increase on original |
|---|---|---|---|---|---|
| A. Acetone | 7×4.5×.0440 | 1.39 | 8.5×5×.0523 | 2.22 | 59.7 |
| B. Ethyl Cellosolve Acetate | 7×4.5×.0431 | 1.36 | 8.3×5×.0494 | 2.05 | 50.7 |
| C. Mixture of 4 parts A and 1 part B | 7×4.5×.0453 | 1.43 | 8.7×4.9×.0541 | 2.31 | 61.5 |
| D. Methylene Chloride | 7×4.5×.0426 | 1.34 | 9.5×5.5×.0517 | 2.70 | 101.5 |

In the tests, samples of the microporous sheet material are immersed in the solvents for four hours at room temperature and both the weight and volume increases recorded. The samples are checked after a further two hours and show no further increase. After removal of the solvents by drying the samples are all found to regain their original dimensions.

Calculations based on the above-mentioned measurements of nap thickness and weight-gain on impregnation (in the foregoing Examples) indicate that the bulk specific gravity of the impregnant in the nap in the product of Example 22 is less than about 0.2, e.g. about 0.15. Since the specific gravity of the polyurethane impregnant is on the order of 1.2, it is apparent that the impregnant occupies less than 15% of the volume of the impregnated nap. In the product shown in FIGS. 21 to 23 the calculated bulk specific gravity of the impregnant in the nap zone is on the order of about 0.5 and the impregnant thus occupies less than half of the volume of impregnated nap. For the product shown in FIGS. 18 to 21 the corresponding figures are about 0.15 and about 19–15%. For the product shown in FIGS. 15 to 17 of the parent application (and described above) the corresponding figures are about 0.05 (bulk specific gravity) and about 5%. In all these products the volume occupied by the fibers themselves is very much below 10%, and well below 5%, of the total volume of the impregnated nap; this can be seen from inspection of FIGS. 18 and 21, particularly by noting the extremely small total area occupied by fiber cross-sections (in the nap zone) in the plane in which the sample has been cut. Accordingly it will be apparent that the proportion of voids in the nap zone is generally above 50%, preferably above 70%, such as 80%, 90% or higher.

In the manufacture of shoes, certain portions of the upper material (such as the portions that are formed into the toe of the shoe) are subjected to severe bending with accompanying compression of the underside. The low density impregnated nap is highly compressible. This may contribute to the excellent behavior of the laminate in shoe-making. In addition, in shoe making the stretching of woven fabric-backed leather substitute materials often causes stressing in a bias direction in which the tensile modulus of the material is relatively low; that is, the rectangular weave pattern of the fabric is easily distorted into a rhombic or diamond pattern by forces exerted in the bias direction. This can result in wrinkling of the skin layer. In the structures of this invention the bonding by nap-impregnation increases substantially the tensile modulus in the bias direction so that the distortion of the weave pattern, and resulting wrinkling, is significantly reduced or eliminated.

The fibers of the nap are usually of a denier per filament such as is conventionally employed in textile fabrics, e.g. in the range of about 1 to 10 denier, such as about 2 to 4 denier per filament. The nap is preferably not a dense one and is preferably unsheared. Typically the number of nap filaments per square inch is below 5,000, usually less than 3,000, such as about 1,000 or 2,000; this number may be measured from a photomicrograph (such as taken with a scanning electron microscope) by drawing two one inch lines at right angles to each other on the photomicrograph, counting the number of nap filaments which cross each line, and multiplying the sum of those two numbers by the magnification of the photomicrograph; thus, if on a photomicrograph taken at 60×, a 1 inch line drawn in the warp direction crosses 10 nap filaments while a one inch line drawn in the filling direction crosses a lesser number, such as 6 nap filaments, the total will be (10 + 6) × 60 = 960 nap filaments per square inch. It will be noted that in the napped fabrics made by conventional napping techniques (without shearing the nap) the number of nap filaments seen to be crossing the line drawn in the wrap will be less than those crossing the line at right angles thereto; also, by unravelling such fabrics one can see that the nap fibers originate primarily from the filling yarns.

The rotating blades of skiving knives typically are about 3 mm thick, the internal angle at the cutting edge of the blade being, say about 20°. They may be flat disks rotating about an axis normal to the plane of the sheet material (as in the Amazeen skiver) or rotating hollow cylinders rotating about an axis parallel to the plane of the sheet material (as in the Pluma skiver).

In the preferred forms of the invention, the bonding of the napped fibers has no substantial effect on the breathability of the product.

According to one aspect of the invention the bonded nap zone may have a desirable rough appearance like that of split suede leather. The napped fibers may be bonded together, as by impregnation thereof with a polymeric bonding agent in amount such that the nap structure is still largely open and porous, as described for instance in the above-mentioned copending patent applications Ser. Nos. 474,406 and 398,696. The surface of the bonded nap is then subjected to a series of spaced short cuts to form spaced clumps of bonded fibers which clumps have free ends projecting from the bonded nap so that they can be brushed from stable upright positions to bent-over positions, giving an attractive rough appearance resembling a split suede leather.

In one preferred embodiment the cutting to form the clumps is effected by means of a rotating "sanding" drum located so that only the tips of its randomly spaced projecting abrasive grains penetrate into the compressible bonded nap while the latter is being moved past the drum (generally at a considerably slower linear speed than the linear speed of the abrasive surface of the drum) in a direction co-current with that of said abrasive surface. It is not clear whether the cutting action of the tips of the abrasive grains is due to their sharp edges or points or due to a tearing action occasioned by their engaging and pulling the bonded fibers to cause them to break in tension, or a combination of these factors, or others. It is within the broader scope of the invention to effect the spaced short cuts or nicks in any other suitable manner and with other apparatus, as by the use of toothed raking or cutting elements moving co-currently, counter-currently or transversely with respect to the bonded nap surface.

As will be seen in the photomicrographs below (and in those in the above mentioned copending U.S. patent application Ser. Nos. 474,406 and 398,696) the nap fibers in at least the outermost zone (e.g. the outermost half) of the bonded nap lie largely parallel to the outer surface (and thus, of course, also parallel to the fabric structure). The fibers of the clumps formed by the more-or-less random cutting action of the abrasive grains are thus generally parallel to the outer surface when the clumps are brushed down but the bases of the clumps are sufficiently flexible that they can be easily brushed up and remain in their brushed-up positions.

Before the surface cutting treatment the opposite face of the fabric is preferably provided with a continuous layer of polymer material as described in Ser. No. 474,406. It is also within the broader scope of the invention to nap both faces of the fabric, give both naps a bonding treatment, and subject one of the nap faces to the cutting treatment; the other nap face may then be given a similar cutting treatment if desired.

The following Examples are given to illustrate this invention further. In this application all proportions are by weight unless otherwise indicated.

EXAMPLE 1A

Figure 1:
FIG. 1 to 8, 12 and 16 are photomicrographs of cross-sections of laminates.

In this Example an unsheared napped 4/1 sateen is employed. This napped fabric weighs about 7 oz/sq. yd. (about 230 g/m$^2$) and has about 64 warp yarns per inch and about 58 filling yarns per inch, the weight of the napped filling yarns (per unit area of napped fabric) being about twice that of the warp yarns (which are substantially free of any nap). FIG. 1 shows a napped filling yarn (which has been slid out from the edge of the fabric without significant effect on its nap); it will be seen that there are many projecting nap fibers longer than 3 mm. A rough idea of the weight of the longer fibers of the nap may be obtained by cutting off the nap fairly close to the main body of the yarn with a scissors; FIG. 2A shows the same yarn as in FIG. 1A after shearing it in that manner, a process which removes some 5% of its weight (equivalent to over 3% of the fabric weight). On testing a sample of the napped fabric it is found to have the following characteristics (for references, see the Wellington Sears Handbook of Industrial Textiles by Ernest R. Kaswell, pub. 1963 by Wellington Sears Company, Inc., N.Y., the appropriate pages of that book are given in parentheses below): gauge, thickness 0.029 inch (pages 571-2); contraction (of yarn), warp 2.06%, filling 8.88% (page 454); yarn no., warp 19.11/1, filling 9.49/1 ("indirect" pages 411–412, non-metric); twist (of yarn), warp 14.90"Z," filling 11.50"Z;" grab strength, warp direction 120 pounds, filling direction 155 pounds (ASTM grab, Instron machine having jaws padded with rubberized duck, pages 470–471); elongation at break, warp direction 19.17%, filling direction 43.06% (pages 559–561); tongue tear strength, warp direction 21 pounds, filling direction 22 pounds (Scott J machine, pages 489–492). The napped fabric is made by napping a 4/1 sateen having a count of about 60 × 60.

The nap of the fabric is impregnated without substantially impregnating the main fabric structure, in the manner described in Example 19 of Ser. No. 474,406 by knife-coating it in two passes. In the first knife-coating pass the fabric travels under tension over rollers and under a coating knife (situated between said rollers) having upstream thereof a bank of the solvent-containing adhesive blend; the coating knife is inclined at an angle to the vertical, the direction of travel being such as to force down the nap (i.e. the free or outermost ends of nap fibers are upstream of the points at which those fibers originate from their parent yarns), to drive the impregnant through the nap to the upper surfaces of the yarns comprising the main woven fabric structure. After this first pass under the coating knife the solvent is evaporated by passing the coated fabric through an oven. The second pass is similar except that the blade is disposed in a vertical plane, perpendicular to the fabric, instead of inclined thereto, the conditions being such that the impregnant is not driven down through the nap but remains substantially within the nap. After the solvent has been evaporated in the oven the final curing of the impregnant occurs on standing. The total weight gain of the fabric as a result of the impregnation is about 2½ oz./yd.$^2$ (about 85 g/m$^2$). The impregnation increases the measured thickness of the fabric from about 0.032 inch to about 0.045 inch. FIGS. 3A, 4A and 5A are views of the impregnated fabric, taken with a scanning electron microscope; FIG. 3A shows the cross-section, FIG. 4A shows the impregnated nap face and FIG. 5A shows the unimpregnated face. It will be seen in FIG. 3A that the impregnation bonds nap fibers together so that when cut with a razor (to form the cut edge at which the photomicrograph was taken) they remain bonded and do not change position significantly, but the impregnation has little if any effect on the fibers within the yarns making up the main woven fabric structure; that is, these inner fibers tend to spread apart at the edge when so cut.

As can be seen from FIG. 1A the nap is not even, but includes fibers of various lengths side by side, and the resulting impregnated nap zone has localized variations in the amounts of impregnant and fiber; these variations are evident in FIGS. 3A and 4A. Thus these FIGS. show thin webs of impregnant which join the bridge neighboring fibers, but which do not form a continuous pore-free layer; substantially unblocked openings or passages greater than 0.05 mm across are visible in both the plan view (FIG. 4A) and the cross-section (FIG. 3A), the latter showing such openings situated between the main interlaced yarn structure and the webs of impregnant which are near the surface of the nap zone. As seen in FIG. 3A the thickness of the impregnated nap zone is in the neighborhood of about 0.5 mm, which is much less than the length of many of the nap fibers (see FIG. 1A) and the nap fibers in at least the outermost portion (e.g. the outermost half) of the nap zone lie largely parallel to the surface (and thus of course also parallel to the fabric structure).

The unimpregnated face of the fabric is then vinyl coated in conventional manner, such as that described in Example 14 of Ser. No. 398,696, giving a structure like that shown in FIGS. 18, 19 and 20 of that application.

The vinyl coating of the resulting structure may be embossed in a leather grain pattern, as by heating the coating (e.g. by infra-red radiation to a temperature of, say, 360°–380° F, preferably while the opposite face of the sheet remains cool, as at 120° F) and passing it between cold pressure rolls; the cold roll which contacts the vinyl coating has a patterned surface and is chilled to effect a permanent shallow embossing of the exposed surface of the vinyl material. The appearance of the impregnated nap face of the resulting impregnated sheet material is substantially unchanged by the coating and embossing treatment.

FIG. 6A is a view of the nap face of the coated embossed material taken with light directed almost perpendicular to the face. The arrow at the side of FIG. 6A is parallel to the "machine" direction, i.e. parallel to the warp yarns; this is the direction in which the fabric is moved, relative to the elements operating thereon, during the napping, impregnating and sanding operations.

The coated sheet material has a substantially uniform thickness, the gauge (as measured with a conventional Ames gauge) varying within a narrow range of less than about ± 0.002 inch (e.g. within about ± 0.01 inch) over most of the area of the sheet. While the individual filling yarns (and the twill structure) of the fabric are apparent to the naked eye even through the nap before the impregnation they are not discernible to the naked eye viewing the napped face after the impregnation; that is, the impregnated napped face has the appearance of a non-woven fabric.

The nap side of the sheet material is then lightly sanded and brushed on a conventional precision sanding machine (e.g. Curtin-Hebert oscillating machine, series 500, size 80 Ser. No. 070,748). The material is fed around the driven rubber coated revolving drum of the machine (with the vinyl side in contact with the drum) and is first lightly abraded by a driven sandpaper covered drum which is set at a controlled distance ("gap") from the rubber surface of the material-carrying drum. While still on the rubber-covered drum the sheet material is then brushed by a driven rotating fiber brush which functions to remove any loose fuzz and deliver it to the outlet of a vacuum collector.

More particularly the arrangement is such that the sheet material is delivered from a supply roll thereof, through a braked tensioning device to the rubber-covered drum, travels approximately 180° around that drum, being engaged by the sandpaper after about 90° of such travel and being engaged by the brush at about the end of such travel, then travels past additional vacuum cleaning devices, through a nip of par of pull-rolls, at least one of which is driven, and is then wound up again. The braked tensioning device is set to provide a predetermined fixed tension on the material as it passes to the rubber-covered drum; this tension, and the pull exerted by the downstream pull-rolls insures that the material is pressed uniformly against the driven rubber-covered drum during its passage thereover.

The sandpaper is 80 grit ("3M Production Paper, E weight, closed coat aluminum oxide grit") and the aforesaid gap is preset at about 0.005 inch less than the thickness of the sheet material so that the penetration of the sandpaper into the nap is only about 0.005 inch (about 0.13 mm) and only the very outer portions of the impregnated nap are nicked by the outer portions of the largest grains of the sandpaper.

FIGS. 7A and 8A are top views of the sandpaper, showing the abrasive grains and the spacing thereof, FIG. 7A being taken with light directed almost perpendicular to the face and FIG. 8A with obliquely reflected light so that the shadows give some indication of the heights of the various grains; in each case the photographs are taken at a magnification of 8.2× (same scale as shown in FIGS. 1A, 2A and 6A). The largest grains, projecting furthest from the paper base of the sandpaper, appear to be spaced (on the average) on the order of about 1 mm apart (e.g. 0.5 to 1.5 mm apart). Visual inspection under the microscope, shows that these largest grains generally have sharp peaks projecting about 0.006 inch or more above their neighboring grains.

Unlike conventional sanding, in this Example the sandpaper is driven in the same direction as the direction of movement of the surface being sanded ("co-sanding" instead of conventional "counter-sanding"). The surface speed of rotation of the sandpaper is about 3,000 feet per minute and the surface speed of the rubber cover of the drum is about one yarn per minute. The sandpaper drum rotates in a direction counter to the nap, i.e. its grains move in a direction from the impregnant-bonded nap fiber ends toward the yarn-anchored nap fiber ends. During its rotation the sanding drum also oscillates axially at a rate of about 2 oscillating cycles per second, the amplitude of oscillation being about ¼ inch so that the path of each sand grain is at a slight angle to the direction of rotation. The diameter of the sanding drum is about 13½ inches and the diameter of the sanding drum is about 9¾ inches; simple calculation will show that with the penetration of 0.005 inch the total travel (measured lengthwise of the sheet material) of the outermost point of a sanding grain within the nap is on the order of about 0.3 inch.

The product has a rough appearance somewhat resembling the "flesh side" of "fleshed" leather (e.g. a "split suede"). Its surface has spaced tiny clumps each made up of a number of nap fibers bonded together; these clumps have free ends projecting outward from the impregnated fibrous surface and have their bases flexibly anchored to the fabric. Many of the clumps can (by light brushing or movement of one's fingernail over the surface) be made to assume a stable more-less upright position or a more-or-less bent-over position. FIGS. 9A and 10A are views of identical areas of the sanded face taken with light directed almost perpendicular to the face light at a magnification of 8.2× (same scale as shown in FIG. 1A), with the clumps brushed up (FIG. 9A) and brushed down (FIG. 10A). In FIG. 9A reference numerals 11, 12, 13 and 14 for instance, show "holes" or depressions from which clumps 11a and 12a, 13a, 14a, have been brushed to the "upright" position; in FIG. 10A such "holes" are not visible (or are largely obscured) since the corresponding clumps have been brushed down to the "bent-over" or "horizontal" position, level with the rest of the surface.

It will be seen that while there are some long unclumped individual fiber ends in the sanded nap, the essential structure is that of clumps made up of a number of bonded fibers (usually well over five fibers such as 20 fibers, per clump) with fiber ends projecting from the clumps. (Note FIG. 11A which is a view of the face taken with a scanning electron microscope). The number of such clumps per unit area varies somewhat over the face of the fabric, e.g. it may be in the range of some 30 to 80 clumps of bonded fibers per square inch. The clumps are relatively thin; some are like flaps having broad bases (e.g. 1 to 2 mm wide) while some have relatively narrow bases (e.g. 0.1 to 0.2 mm wide) and look more like thick yarns. The flaps are of varying free lengths, some being as much as 3 or 4 mm long (from the "anchored end" of the flap to its free end) while others are as little as about ½ mm long or less; the lengths of the flaps are often considerably greater than the effective thickness of the impregnated pile, which as seen in FIG. 12A (a cross-section of the sanded product) is well over 0.3mm, i.e., about 0.5mm.

The thickness of the sheet material (measured with an Ames gauge) is only slightly, if at all, changed by the sanding and there is very little loss of weight in sanding. Thus, before sanding the thickness (measured with an Ames gauge) is about 0.0870 inch and the weight is about 48.05 oz./sq. yd.; after sanding, brushing (and accompanying vacuum removal of loose material) the corresponding values are 0.0855 inch and 47.7 oz./sq.yd.

Similar results are obtained at different sanding speeds, e.g. with sanding surface moving at about 600 feet per minute [#1 setting] while the sheet material moves in the same direction at about 10 yards per minute.

EXAMPLE 2A

Instead of applying a vinyl coating (as in Example 1A) to the unnapped face of the fabric, a skin-covered layer of microporous polyurethane is applied in the manner described in Example 26a of application Ser. No. 474,406. The resulting sheet material has a thickness of about 0.080 inch.

EXAMPLE 3A

Example 1A is repeated, but using a stiffer vinyl layer which contains 100–150 parts of mineral filler (e.g. very fine calcium carbonate powder of average particle size about 1 micron or less, such as Duramite or Atomite) per 100 parts polyvinyl chloride. This layer may, or may not, be blown (expanded) to make it porous.

EXAMPLE 4A

Example 1A is repeated but instead of applying vinyl coating to the unnapped face of the fabric, that face is adhered to skin-covered thin layer (20 mils thick) of microporous material as described in Example 2 of the previously mentioned application Ser. No. 474,406. The release paper (on which the skin is formed) has a very smooth surface which imparts to the skin a glossy patent leather finish. Before laminating the fabric to the microporous material the unnapped face is lightly sanded to grind off high portions of yarns at that face (leaving fabric smoother and slightly fuzzy); this helps to avoid "show-through" on severe lasting.

EXAMPLE 5A (a) In this Example the impregnated fabric is laminated to a microporous sheet material which has a dense skin layer temporarily adhered to release paper, the assemblage being prepared in the manner described in Example 1 of said Ser. No. 474,406. The microporous sheet material has two integral microporous layers of different specific gravity; its upper layer, in contact with the skin, is about 15 mils thick and has a specific gravity of about 0.35. Its lower layer has a specific gravity of about 0.5; the bottom face of the lower layer 21 (FIG. 13A) has tiny spaced projections or fingers F (formed during the manufacture of the material, as described in Warwicker et al U.S. Pat. No. 3,860,680 issued Jan. 15, 1975, whose entire disclosure is incorporated herein by reference; see particularly FIGS. 5 to 8 of that patent and the descriptions of those FIGS. in the patent). An adhesive is applied to the bottom face of the lower layer and the assemblage is laminated to the smooth face of the impregnated fabric in the manner described in Example 1 or Example 7 of said Ser. No. 474,406. The product has spaces at the interface as seen in FIG. 13A. The nap may be sanded to form the spaced flexible clumps as in Example 1 hereof. The use of a material having the spaced projections (or conversely, spaced recesses), rather than one from which those projections have been removed (e.g. sanded off) appears to improve the moisture vapor transmission of the product.

(b) Example 5A is repeated except that the microporous sheet material is prewet with water, as described in Example 2 of said Ser. No. 474,406 before it is adhered to the skin layer. Also, the adhesive is applied to only the outer faces of the tiny projections or fingers (rather than also to the depressions between those projections) by using a reverse-roll applicator.

(c) Example 5a,b is repeated except that the microporous sheet (having the 15 mil thick upper layer of 0.35 specific gravity) has a total thickness of about 55 to 60 mils instead of about 75 to 80 mils, giving a final product whose thickness is about 100 mils rather than about 120 mils (about 3mm).

(d) and (e). Examples Aa, b and c are repeated except that in each case the less dense upper layer occupies a larger proportion of the thickness of the microporous sheet, being about 35 mils thick.

As previously mentioned, best results have thus far been obtained by co-sanding rather than counter-sanding. The reasons for this are not understood. They may be related to the directions of the forces transmitted from the rubber surface of the driven sheet-transporting drum, through the porous polymer layer and the interlaced yarn structure, to the impregnated nap zone.

The characteristics, uses and advantages of the product are those described in said application Ser. No. 474,406, with the additional advantage of the attractive suede-like or flesh-leather appearance making it very suitable for unlined shoes, in which the nap face may be on the inside or even on the outside (as in boots in which the vamp and quarter portions of the upper have the nap face on the inside and the leg portion is made with the nap face on the outside). This appearance also makes it suitable for use in luggage, such as soft-sided luggage; here again the nap side may be on the inside or outside of the luggage, or alternately on one side nd then the other (as in the boots described above).

In the foregoing Examples the woven fabric is a dyed fabric having a buff color and the impregnant in the nap is pigmented to have a similar buff color. The product has an apearance very much like that of natural suede or natural split suede leather. It is within the broader scope of the invention to use any desired color of fabrics; the impregnant is preferably colored in the same hue as the fabric.

While woven fabric is employed in the foregoing Examples it will be understood that knitted fabrics may be employed instead. The fabric characteristics are described in the previously mentioned application Ser. No. 474,406. In general it is preferred to use a napped material whose grab tensile strength (before impregnation, or after bonding of the nap) is well above 50 lbs. preferably above 80 lbs. and more preferably at least about 100 lbs. and whose tongue tear strength is at least about 10 lbs. in both directions. It is noted that in the napping operation the fabric shrinks and the resultant structure has a desirable high elongation and a stress-strain curve similar to that of the natural leather used for shoe uppers. In general the napped fabric before bonding weighs at least about 5 oz./yd.$^2$ (at least about 160 g/m$^2$).

It will be understood that the moving of the clumps to upright or bent-over positions can be effected with any suitable brush (e.g. a hair brush or suede brush), or even with the fingers, without any further severing of fibers or impregnant webs.

It is understood that the foregoing detailed description is given merely by way of illustration and that variations may be made therein without departing from the spirit of the invention.

We claim:

1. An artificial leather sheet material for lasted shoe uppers comprising a backing layer of permeable fabric of interlaced multifilament yarns and a continuous microporous elastomeric polymer layer on its upper face wherein the improvement comprises that the lower face of said fabric has a nap of fibers teasted from said yarns and bonded together, said bonded nap being open and compressible, having a void volume above 50% and a thickness of about 0.1 to 1 mm, said shoe upper sheet material having a thickness of at least about 1.2 mm, said bonded nap comprising said teased-out fibers and an elastomeric bonding agent.

2. Product as in claim 1 in which said fabric is a woven fabric.

3. Product as in claim 2 in which said fabric comprises cellulosic fibers.

4. Product as in claim 2 in which said fabric comprises thermoplastic organic polymeric fibers.

5. Product as in claim 1 in which said microporous layer has a continuous substantially non-porous skin at its upper surface.

6. Product as in claim 5 in which said microporous layer is of microporous elastomeric polyurethane.

7. Product as in claim 5 in which said microporous layer is of blown plasticized polyvinyl chloride.

8. Product as in claim 1 in which the void volume of said bonded nap is above 70%.

9. Product as in claim 1 in which the bulk specific gravity of the bonding agent in the nap zone is at most about 0.5.

10. Product as in claim 1 in which the interlaced fabric structure is substantially free of bonding agent but said bonding agent is in contact with surfaces of the multifiber yarns at the base of said nap.

11. Product as in claim 1 in which the thickness of said bonded nap is about 0.1 to 0.7 mm.

12. Product as in claim 11 which the there is a continuous cellular elastomeric layer on the upper face of said fabric and a thin continuous substantially non-porous skin on the upper surface of said cellular layer, the combined thickness of said cellular layer and said skin being about 0.2 to 1.5 mm.

13. Product as in claim 12 in which the specific gravity of said cellular layer is less than about 0.6 and the specific gravity of said skin is at least 0.9.

14. Product as in claim 13 in which said yarns are twisted staple fiber yarns, the total weight of fibers in said interlaced fabric and the nap thereof is at least 200 g/m$^2$ and said fibers are largely thermoplastic staple fibers.

15. Product as in claim 14 in which said thermoplastic staple fibers are largely polyethylene terephthalate and said total weight is in the range of about 200 to 300 g/m².

16. Product as in claim 14 in which said thermoplastic staple fibers are largely stereoregular polypropylene and said total weight is in the range of about 200 to 300 g/m².

17. Product as in claim 14 in which said bonded nap comprises said teased-out fibers and an elastomeric bonding agent therefor, and said bonding agent is present as webs joining individual filaments of the nap, said webs being so thin that the outlines of individual nap fibers are visible, said bonded nap being open, compressible and having the feel of a fabric surface and having a void volume above 50%, and in which said webs bridge neighboring fibers, but do not form a continuous pore-free layer, there being impregnant-free spaces between fibers, said void volume being over 70%, said fabric having at least 3000 yarn cross overs per square inch.

18. Product as in claim 14 in which said bonded nap comprises said teased-out fibers and an elastomeric bonding agent therefor and said bonding agent is present as nodules deposited from a dispersion of particles of said agent.

19. In the process for making artificial leather sheet material for shoe uppers in which a continuous microporous elastomeric polymer layer is applied to a fabric, the improvement which comprises providing a fabric having an interlaced structure of multifiber twisted yarns, teasing from yarns of said fabric a nap of fibers anchored within said twisted yarns, bonding together fibers of said nap to form an open, compressible bonded nap having a thickness of about 0.1 to 1 mm and applying said polymer layer to the face of the fabric opposite to said nap, the thickness of said polymer layer and said fabric being such that the total thickness of said artificial leather sheet material is at least about 1.2 mm, said bonding comprising applying to said nap a solution of an elastomeric bonding agent without substantial impregnation of the interlaced yarn structure of said fabric, and removing liquid of said solution to set said bonding agent while maintaining said nap in such open condition that the void volume of the bonded nap is at least 50%, the conditions of said impregnation and removing being such that the set bonding agent is present as webs joining individual filaments of the nap, said webs being so thin that the outlines of individual nap fibers are visible, and said webs bridge neighboring fibers, but do not form a continuous pore-free layer, there being impregnant-free spaces between fibers.

20. In the process for making artificial leather sheet material for shoe uppers in which a continuous microporous elastomeric polymer layer is applied to a fabric, the improvement which comprises providing a fabric having an interlaced structure of multifiber twisted yarns, teasing from yarns of said fabric a nap of fibers anchored within said twisted yarns, bonding together fibers of said nap to form an open, compressible bonded nap having a thickness of about 0.1 to 1 mm and applying said polymer layer to the face of the fabric opposite to said nap, the thickness of said polymer layer and said fabric being such that the total thickness of said artificial leather sheet material is at least about 1.2 mm, said bonding comprising applying to said nap a dispersion of particles of an elastomeric bonding agent in a liquid and removing liquid of said dispersion to set said bonding agent while maintaining said nap in such open condition that the void volume of the bonded nap is at least 50%.

21. Process as in claim 20 in which said dispersion is an aqueous latex.

22. A lasted shoe upper of the material of claim 1.

23. A lasted shoe upper of the material of claim 17.

24. Product as in claim 17 in which the bonding of said nap fibers is such as to have no substantial effect on the breathability of the product, said nap is unsheared, has fibers longer than 2 mm, has about 1000 to 3000 nap filaments per square inch and substantial components lying generally parallel to the main plane of the fabric, said void volume is above 70%, the napped fabric is a woven fabric which, as such and without bonding of the nap, has a trouser tear strength of at least about 7 pounds in both warp and filling direction and an elongation at break of at least 10% and a modulus at 5% elongation of about 5 to 30 lbs./in., said fabric being woven in a pattern having repeating lengths of yarn spanning at least two transverse yarns.

* * * * *